(12) United States Patent
Maheshwari et al.

(10) Patent No.: US 8,037,228 B2
(45) Date of Patent: Oct. 11, 2011

(54) BRIDGE DEVICE WITH PAGE-ACCESS BASED PROCESSOR INTERFACE

(75) Inventors: Dinesh Maheshwari, Fremont, CA (US); Jagadeesan Rajamanickam, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 251 days.

(21) Appl. No.: 12/228,787

(22) Filed: Aug. 14, 2008

(65) Prior Publication Data

US 2009/0055569 A1   Feb. 26, 2009

Related U.S. Application Data

(60) Provisional application No. 60/957,946, filed on Aug. 24, 2007.

(51) Int. Cl.
G06F 13/36 (2006.01)
G06F 13/00 (2006.01)

(52) U.S. Cl. ........ 710/306; 710/310; 710/311; 710/315; 711/103

(58) Field of Classification Search ......... 710/306–307, 710/310–311, 313–315, 62, 65, 74; 711/2, 711/103
See application file for complete search history.

(56) References Cited

U.S. PATENT DOCUMENTS

| | | |
|---|---|---|
| 4,641,261 A | 2/1987 | Dwyer et al. |
| 4,701,913 A | 10/1987 | Nelson |
| 4,713,757 A | 12/1987 | Davidson et al. |
| 4,862,355 A | 8/1989 | Newman et al. |
| 4,866,606 A | 9/1989 | Kopetz |
| 4,890,222 A | 12/1989 | Kirk |
| 5,289,580 A | 2/1994 | Latif et al. |
| 5,388,249 A | 2/1995 | Hotta et al. |
| 5,392,421 A | 2/1995 | Lennartsson |
| 5,402,394 A | 3/1995 | Turski |
| 5,416,909 A | 5/1995 | Long et al. |
| 5,428,748 A | 6/1995 | Davidson et al. |
| 5,454,080 A | 9/1995 | Fasig et al. |
| 5,461,723 A | 10/1995 | Shah et al. |
| 5,488,657 A | 1/1996 | Lynn et al. |
| 5,497,067 A | 3/1996 | Shaw |
| 5,574,859 A | 11/1996 | Yeh |
| 5,577,213 A | 11/1996 | Avery et al. |
| 5,586,268 A | 12/1996 | Chen et al. |

(Continued)

FOREIGN PATENT DOCUMENTS

EP   0987876 A2   1/1999

(Continued)

OTHER PUBLICATIONS

International Written Opinion of International Searching Authority, dated Nov. 19, 2008 for International Application No. PCT/US08/09798; 5 pages. International Search Report of International Searching Authority, dated Nov. 19, 2008 for International Application No. PCT/US08/09798; 4 pages.
U.S. Appl. No. 11/906,033, Not Published, Rajamanickam et al.
U.S. Appl. No. 11/903,271, Not Published, Khodabandehlou et al.

(Continued)

*Primary Examiner* — Thomas J Cleary

(57) ABSTRACT

An integrated circuit bridge device can include a first interface circuit coupled to a buffer circuit and a configurable in response to configuration information to receive command information, address information, and data values on a same multi-bit input/output (I/O) bus. A second interface circuit can be coupled to the buffer circuit and configured to communicate according to a first communication protocol different from that executable by the first interface circuit. In addition, a controller circuit formed in the same substrate as the first and second interface circuits can be configured to enable data transfers between the first interface circuit and the second interface circuits via the buffer circuit.

20 Claims, 14 Drawing Sheets

U.S. PATENT DOCUMENTS

| | | | |
|---|---|---|---|
| 5,598,409 A | 1/1997 | Madonna et al. |
| 5,606,672 A | 2/1997 | Wade |
| 5,615,344 A | 3/1997 | Corder |
| 5,621,902 A | 4/1997 | Cases et al. |
| 5,628,001 A | 5/1997 | Cepuran |
| 5,630,147 A | 5/1997 | Datta et al. |
| 5,634,074 A | 5/1997 | Devon et al. |
| 5,642,489 A | 6/1997 | Bland et al. |
| 5,655,148 A | 8/1997 | Richman et al. |
| 5,671,355 A | 9/1997 | Collins |
| 5,673,031 A | 9/1997 | Meier |
| 5,675,813 A | 10/1997 | Holmdahl |
| 5,687,346 A | 11/1997 | Shinohara |
| 5,701,429 A | 12/1997 | Legvold et al. |
| 5,748,911 A | 5/1998 | Maguire et al. |
| 5,748,923 A | 5/1998 | Eitrich |
| 5,754,799 A | 5/1998 | Hiles |
| 5,758,188 A | 5/1998 | Appelbaum et al. |
| 5,767,844 A | 6/1998 | Stoye |
| 5,774,744 A | 6/1998 | Story et al. |
| 5,778,218 A | 7/1998 | Gulick |
| 5,781,028 A | 7/1998 | Decuir |
| 5,793,745 A | 8/1998 | Manchester |
| 5,794,033 A | 8/1998 | Aldebert et al. |
| 5,802,328 A | 9/1998 | Yoshimura |
| 5,802,558 A | 9/1998 | Pierce |
| 5,805,834 A | 9/1998 | McKinley |
| 5,828,854 A | 10/1998 | Wade |
| 5,838,907 A | 11/1998 | Hansen |
| 5,859,988 A | 1/1999 | Ajanovic et al. |
| 5,862,362 A | 1/1999 | Somasegar et al. |
| 5,898,861 A | 4/1999 | Emerson et al. |
| 5,974,486 A | 10/1999 | Siddappa |
| 5,982,879 A | 11/1999 | Lucey |
| 6,009,480 A | 12/1999 | Pleso |
| 6,012,103 A | 1/2000 | Sartore et al. |
| 6,012,115 A | 1/2000 | Chambers et al. |
| 6,038,667 A | 3/2000 | Helbig, Sr. |
| 6,049,870 A | 4/2000 | Greaves |
| 6,049,885 A | 4/2000 | Gibson et al. |
| 6,067,628 A | 5/2000 | Krithivas et al. |
| 6,085,325 A | 7/2000 | Jackson et al. |
| 6,085,328 A | 7/2000 | Klein et al. |
| 6,122,676 A | 9/2000 | Brief et al. |
| 6,125,420 A | 9/2000 | Eidson |
| 6,145,045 A | 11/2000 | Falik et al. |
| 6,148,354 A | 11/2000 | Ban et al. |
| 6,173,355 B1 | 1/2001 | Falik et al. |
| 6,175,883 B1 | 1/2001 | Kvamme et al. |
| 6,189,060 B1 | 2/2001 | Kodama |
| 6,199,122 B1 | 3/2001 | Kobayashi |
| 6,212,165 B1 | 4/2001 | Mann et al. |
| 6,226,291 B1 | 5/2001 | Chauvel et al. |
| 6,233,640 B1 | 5/2001 | Luke et al. |
| 6,249,825 B1 | 6/2001 | Sartore et al. |
| 6,272,644 B1 | 8/2001 | Urade et al. |
| 6,275,499 B1 | 8/2001 | Wynn et al. |
| 6,279,060 B1 | 8/2001 | Luke et al. |
| 6,292,863 B1 | 9/2001 | Terasaki et al. |
| 6,311,294 B1 | 10/2001 | Larky et al. |
| 6,366,980 B1 | 4/2002 | Haines et al. |
| 6,389,495 B1 | 5/2002 | Larky et al. |
| 6,415,343 B1 | 7/2002 | Fensore et al. |
| 6,493,770 B1 | 12/2002 | Sartore et al. |
| 6,505,267 B2 | 1/2003 | Luke et al. |
| 6,513,128 B1 | 1/2003 | Wang et al. |
| 6,529,988 B1 | 3/2003 | Yoshikawa et al. |
| 6,532,525 B1 | 3/2003 | Aleksic et al. |
| 6,564,349 B1 | 5/2003 | Mitten et al. |
| 6,601,118 B1 | 7/2003 | Rooney |
| 6,615,306 B1 | 9/2003 | Ajanovic |
| 6,618,788 B1 | 9/2003 | Jacobs |
| 6,622,195 B2 | 9/2003 | Osakada et al. |
| 6,622,251 B1 | 9/2003 | Lindskog et al. |
| 6,625,687 B1 | 9/2003 | Halbert et al. |
| 6,633,537 B1 | 10/2003 | Shimizu |
| 6,633,933 B1 | 10/2003 | Smith et al. |
| 6,633,944 B1 | 10/2003 | Holm et al. |
| 6,678,761 B2 | 1/2004 | Garney et al. |
| 6,684,272 B1 | 1/2004 | Leete et al. |
| 6,697,906 B1 | 2/2004 | Ayukawa et al. |
| 6,718,412 B2 | 4/2004 | Purcell et al. |
| 6,760,852 B1 | 7/2004 | Gulick |
| 6,816,929 B2 | 11/2004 | Ueda |
| 6,816,976 B2 | 11/2004 | Wright et al. |
| 6,934,793 B2 | 8/2005 | Ying et al. |
| 6,938,108 B2 | 8/2005 | Ohie et al. |
| 6,970,419 B1 | 11/2005 | Kalkunte et al. |
| 7,007,112 B2 | 2/2006 | Ishida et al. |
| 7,010,638 B2 | 3/2006 | Deng et al. |
| 7,054,980 B2 | 5/2006 | Wurzburg |
| 7,062,618 B2 | 6/2006 | Tsunoda et al. |
| 7,073,008 B2 | 7/2006 | Wu et al. |
| 7,073,010 B2 | 7/2006 | Chen et al. |
| 7,076,568 B2 | 7/2006 | Philbrick et al. |
| 7,080,189 B1 | 7/2006 | Luttmann |
| 7,082,545 B2 | 7/2006 | Kubo et al. |
| 7,110,006 B2 | 9/2006 | MacInnis et al. |
| 7,127,546 B2 | 10/2006 | Ying et al. |
| 7,143,227 B2 | 11/2006 | Maine |
| 7,162,565 B1 | 1/2007 | Kolokowsky et al. |
| 7,162,566 B2 | 1/2007 | Lin |
| 7,187,946 B2 | 3/2007 | Palan |
| 7,213,096 B2 | 5/2007 | Keys et al |
| 7,231,485 B2 | 6/2007 | Harris et al. |
| 7,231,653 B2 | 6/2007 | Jutzi |
| 7,394,471 B2 | 7/2008 | Chan et al. |
| 7,478,191 B2 | 1/2009 | Wurzburg et al. |
| 7,484,031 B2 | 1/2009 | Tjia |
| 7,523,243 B2 | 4/2009 | Bohm et al. |
| 7,640,385 B2 | 12/2009 | Ng et al. |
| 7,644,147 B1 | 1/2010 | Wohlgemuth et al. |
| 7,921,244 B2 | 4/2011 | Chang et al. |
| 2003/0185249 A1 | 10/2003 | Davies et al. |
| 2003/0202510 A1 | 10/2003 | Witkowski et al. |
| 2003/0212841 A1 | 11/2003 | Lin |
| 2004/0003164 A1* | 1/2004 | Boily ............ 710/306 |
| 2004/0010612 A1 | 1/2004 | Pandya |
| 2004/0030766 A1 | 2/2004 | Witkowski |
| 2004/0181811 A1 | 9/2004 | Rakib |
| 2005/0060490 A1 | 3/2005 | Lu |
| 2005/0157711 A1 | 7/2005 | O'Dell et al. |
| 2006/0036558 A1 | 2/2006 | Mathews |
| 2006/0056401 A1 | 3/2006 | Bohm et al. |
| 2006/0059293 A1 | 3/2006 | Wurzburg et al. |
| 2006/0253639 A1 | 11/2006 | Lee et al. |
| 2007/0079045 A1 | 4/2007 | Luke |
| 2007/0170268 A1 | 7/2007 | Lee |
| 2007/0186016 A1 | 8/2007 | Mennekens et al. |
| 2008/0046638 A1* | 2/2008 | Maheshwari et al. ........ 711/103 |
| 2008/0307145 A1 | 12/2008 | Goren et al. |
| 2009/0187745 A1 | 7/2009 | Hino et al. |

FOREIGN PATENT DOCUMENTS

| | | |
|---|---|---|
| EP | 0890905 A2 | 3/2000 |
| EP | 1111498 A2 | 6/2001 |
| JP | 404200119 A | 7/1992 |
| JP | 410097303 A | 4/1998 |
| JP | 410097309 A | 4/1998 |

OTHER PUBLICATIONS

U.S. Appl. No. 11/904,758, Not Published, Khodabandehlou et al.

Compaq Computer Corporation et al., *Universal Serial Bus Specification—Rev 2.0*, Apr. 27, 2001, pp. ii, 18-19, 33-34, 120, 145, 196-207, 227-228.

Cypress Semiconductor Corporation, *MoBL-USBTM FX2LP18 USB Microcontroller*, 2007.

"USB 2.0 mux interfaces USB, non-USB devices", *EE Times Asia*, May 15, 2007, found on the Internet at http://www.eetasia.com/ART_8800464295_NP_870689ba.HTM?1000013030&8800464295&click_from=1000013030,8619953561,2007-05-15,EEOL,EENEWS.

Intersil Americas Inc., *ISL54200 Data Sheet FN6408.0*, Jan. 24, 2007.

Inoue et al., *NAND Flash Applications Design Guide—Revision 1.0*, Toshiba America Electronic Components, Inc., Apr. 2003.

Micron Technology Inc., *NAND Flash Memory Data Sheet MT29F4G08AAA, MT29F8G08BAA, MT29F8G08DAA, MT29F16G08FAA*, 2006.
Cypress Semiconductor Corporation, *West Bridge™ Astoria™ Data Sheet CYWB0224ABS/CYWB0224ABM* (Advanced Information), Dec. 7, 2007.
USPTO Notice of Allowance for U.S. Appl. No. 09/176,047 dated Jun. 26, 2001; 4 pages.
USPTO Non-Final Rejection for U.S. Appl. No. 09/176,047 dated Feb. 28, 2001; 7 pages.
Universal Serial Bus Specification, Revision 1.0, Jan. 15, 1996, pp. 1-267.
Intel USB Mobile System Design Guidelines, Revision 1.0, Nov. 6, 1996, pp. 1-19.
Universal Serial Bus and the Multimedia PC, by Kosar A. jaff, 1996, pp. 1-9.
Intel USB Voltage Drop and Droop Measurement, Nov. 18,1996, pp. 1-19.
USPTO Non-Final Rejection for U.S. Appl. No. 09/812,475 dated Oct. 10, 2001; 4 pages.
USPTO Final Rejection for U.S. Appl. No. 09/812,475 dated May 8, 2002; 7 pages.
USPTO Notice of Allowance for U.S. Appl. No. 09/812,475 dated Aug. 13, 2002; 7 pages.
Lucent Technologies, "USS-720 Instant USB USB-to-IEEE 1284 Bridge," Advance Data Sheet, Rev. 5, Nov. 1997; 28 pages.
USPTO Notice of Allowance for U.S. Appl. No. 10/160,442 dated Mar. 2, 2006; 3 pages.
USPTO Final Rejection for U.S. Appl. No. 10/160,442 dated Dec. 23, 2005; 10 pages.
USPTO Non-Final Rejection for U.S. Appl. No. 10/160,442 dated Oct. 17, 2005; 8 pages.
USPTO Non-Final Rejection for U.S. Appl. No. 10/160,442 dated Jul. 22, 2005; 7 pages.
USPTO Advisory Action for U.S. Appl. No. 10/160,442 dated Apr. 22, 2005; 3 pages.
USPTO Final Rejection for U.S. Appl. No. 10/160,442 dated Feb. 9, 2005; 8 pages.
USPTO Non-Final Rejection for U.S. Appl. No. 10/160,442 dated Aug. 25, 2004; 7 pages.
Lucent Technologies delivers Instant USB for peripherals, press release, Jan. 1997; 3 pages.
USPTO Notice of Allowance for U.S. Appl. No. 10/796,872 dated Sep. 6, 2006; 6 pages.
Universal Serial Bus Mass Storage Class Specification Overview Revision 1.2 USB Implementers Forum Jun. 23, 2003 pp. 1-7.
Universal Serial Bus Mass Storage Class Bulk-Only Transport Revision 1.0USB Implementers Forum Sep. 31, 1999 pp. 1-22.
Universal Serial Bus Mass Storage Class Control/Bulk/Interrupt Revision 1.0 USB Implementers Forum Dec. 14, 1998 pp. 1-26.
CY4611—FX2 USB to ATA/CF Reference Design Notes Cypress Semiconductor Corporation Nov. 2000-Jul. 2002 pp. 1-7.
CY7C68013 EZ-USB.RTM. FX2.TM.USB Microcontroller High-Speed USB Peripheral Controller Cypress Semiconductor Corporation Jun. 21, 2002 pp. 1-50.
Advanced Technology Attachment ATA-2 From: PC Guide.com Jan. 2003, pp. 1-14.
ATA Short for Advanced Technology Attachment From: Webopedia.com Jan. 2003 p. 1.
Serial ATA Interface on Client Systems Tom Pratt, Dell Computer Corporation Jun. 2003 pp. 1-4.
CY7C68300A Revision *B Cypress Semiconductor Corporation pp. 4 and 11.
EZ-USB FX2 Technical Reference Manual Version 2.1 Cypress Semiconductor Corporation Copyright 2000, 2001 pp. 1-130.
Universal Serial Bus Specification Revision 2.0 USB Implementers Forum Apr. 27, 2000 pp. Title pp. ii, 1-83 and 195-296.
USPTO Notice of Allowance for U.S. Appl. No. 09/990,739 dated Feb. 7, 2007; 4 pages.
USPTO Final Rejection for U.S. Appl. No. 09/990,739 dated Dec. 6, 2006; 12 pages.
USPTO Non-Final Rejection for U.S. Appl. No. 09/990,739 dated Jul. 24, 2006; 17 pages.
USPTO Miscellaneous Action with SSP for U.S. Appl. No. 09/990,739 dated Jun. 7, 2005; 4 pages.
USPTO Advisory Action for U.S. Appl. No. 09/990,739 dated Feb. 2, 2005; 3 pages.
USPTO Final Rejection for U.S. Appl. No. 09/990,739 dated Oct. 28, 2004; 9 pages.
USPTO Non-Final Rejection for U.S. Appl. No. 09/990,739 dated Apr. 7, 2004; 9 pages.
USB in a Nutshell, http://www.beyondlogic.org/usbnutshell/usb-in-a-nutshell.pdf. cited by examiner.
Definition of "state machine" from Whatis.com. cited by examiner.
NEC, NEC USB2.0-ATA/ATAPI Bridge, NEC Press Release Oct. 5, 2000, 2 pages.
USPTO Notice of Allowance for U.S. Appl. No. 11/240,908 dated Jun. 11, 2009; 4 pages.
USPTO Final Rejection for U.S. Appl. No. 11/240,908 dated Nov. 14, 2008; 11 pages.
USPTO Non-Final Rejection for U.S. Appl. No. 11/240,908 dated Apr. 8, 2008; 11 pages.
USPTO Final Rejection for U.S. Appl. No. 11/240,908 dated Nov. 14, 2007; 10 pages.
USPTO Non-Final Rejection for U.S. Appl. No. 11/240,908 dated Mar. 28, 2007; 6 pages.
USPTO Miscellaneous Action with SSP for U.S. Appl. No. 11/240,908 dated Aug. 24, 2006; 1 page.
COMPAQ, et al., Universal Serial Bus Specification, Revision, 2.0 Apr. 27, 2000; 9 pages.
International Search Report for International Application No. PCT/US06/33412, mailed Sep. 14, 2007; 1 page.
Written Opinion of the International Searching Authority for International Application No. PCT/US06/33412, mailed Sep. 14, 2007; 4 pages.
USPTO Advisory Action for U.S. Appl. No. 11/906,033 dated Mar. 7, 2011; 1 page.
USPTO Final Rejection for U.S. Appl. No. 11/906,033 dated Dec. 22, 2010; 7 pages.
USPTO Non-Final Rejection for U.S. Appl. No. 11/906,033 dated May 28, 2010; 8 pages.
USPTO Non-Final Rejection for U.S. Appl. No. 11/906,033 dated Oct. 29, 2009; 8 pages.
Universal Serial Bus Mass Storage Class Specification Overview Revision 1.1, Jun. 28, 2000; pp. 1-7; 7 pages.
Fairchild Semiconductor Corporation, Fairchild P/N "74AC00-Quad 2-Input NAND Gate," Nov. 1999, pp. 1-2; 2 pages.
Fairchild Semiconductor Corporation, Fairchild P/N "74AC04-Hex Inverter," Nov. 1999, pp. 1-2; 2 pages.
Cypress Semiconductor Corporation, "West Bridge: Antioch USB/Mass Storage Peripheral Controller," Revised Mar. 2007, Revision C, CYWB0124AB, pp. 1-20; 20 pages.
"Designing a Robust USB Serial Interface Engine (SIE)," <http://www.usb.org/developers/whitepapers/siewp.pdf>, [Oct. 2003, Retrieved from the Internet on Mar. 25, 2010], pp. 1-9; 9 pages.
USPTO Notice of Allowance for U.S. Appl. No. 09/273,310 dated Dec. 18, 2000; 3 pages.
Axelson, Jan; "USB Complete"; Independent Publishers Group; Third Edition; 2005; pp. i-xiv.
USPTO Notice of Allowance for U.S. Appl. No. 11/904,758 dated Sep.8, 2010; 4 pages.
USPTO Non-Final Rejection for U.S. Appl. No. 11/904,758 dated Mar. 17, 2010; 9 pages.
USPTO Advisory Action for U.S. Appl. No. 11/904,758 dated Jan. 7, 2010; 3 pages.
USPTO Final Rejection for U.S. Appl. No. 11/904,758 dated Oct. 29, 2009; 8 pages.
USPTO Non-Final Rejection for U.S. Appl. No. 11/904,758 dated Apr. 1, 2009; 6 pages.

* cited by examiner

PAGE READ

① Receive Page Read Command
② Apply CMD/ADD data to Controller
③ Translate CMD/ADD to target buffer
   Configure path to target buffer
④ Issue BUSY ⑤ Issue READY
⑥ Output READ data from target buffer in resposne to RE signal PAGE PROGRAM
① Receive Page Program Command
② Apply CMD/ADD data to Controller
③ Translate CMD/ADD to target buffer
   Configure path to target buffer ④ Input PROG data to target
   buffer according to WE signal
⑤ Issue BUSY ⑥ Store status info from target buffer
⑦ Issue READY

```
#ADD_bytes = User_Value
BLK_Size = User_Value
event_Command Received(True)
    Read P-Port CMD/ADD Reg
```

FIG. 9A

```
for i = 1 to #ADD_bytes
    ADD_DATA = P-Port Byte [0 + i]
if BLK_Size = SB
    CMD_DATA = P-Port Byte[0]
if BLK_Size = LB
    CMD_DATA = P-Port Byte [0] :: P-Port Byte [#ADD_byte +1)]
```

FIG. 9B

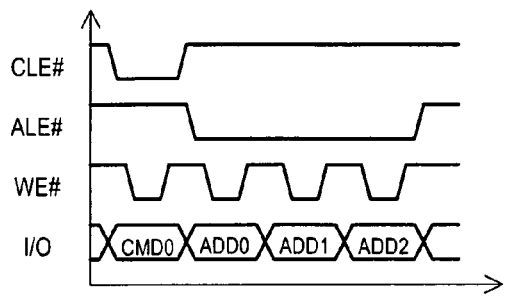

FIG. 10A-0

| BLK_Size = SB ADD_Byte = 3 | |
|---|---|
| ADD | DATA |
| Port Reg 00 | CMD0 |
| ⋮ | |
| Port Reg 10 | ADD0 |
| Port Reg 11 | ADD1 |
| Port Reg 12 | ADD2 |

FIG. 10A-1

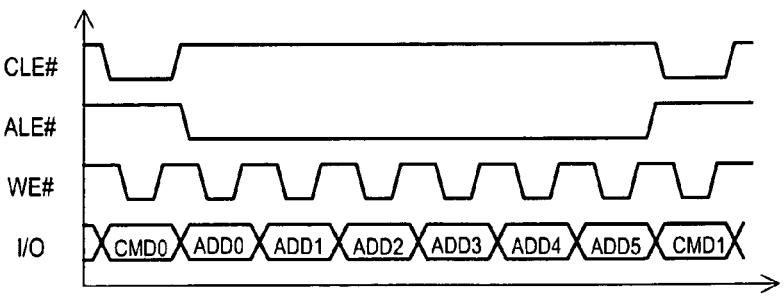

FIG. 10B-0

| BLK_Size = LB ADD_Byte = 6 | |
|---|---|
| ADD | DATA |
| Port Reg 00 | CMD0 |
| Port Reg 01 | CMD0 |
| ⋮ | |
| Port Reg 10 | ADD0 |
| Port Reg 11 | ADD1 |
| Port Reg 12 | ADD2 |
| Port Reg 13 | ADD3 |
| Port Reg 14 | ADD4 |
| Port Reg 15 | ADD5 |

FIG. 10B-1

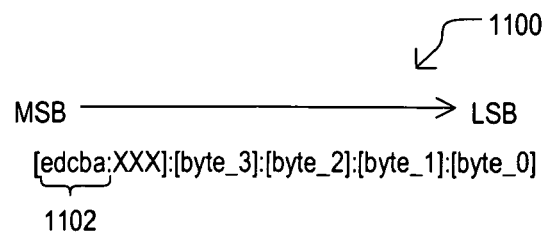
FIG. 11A
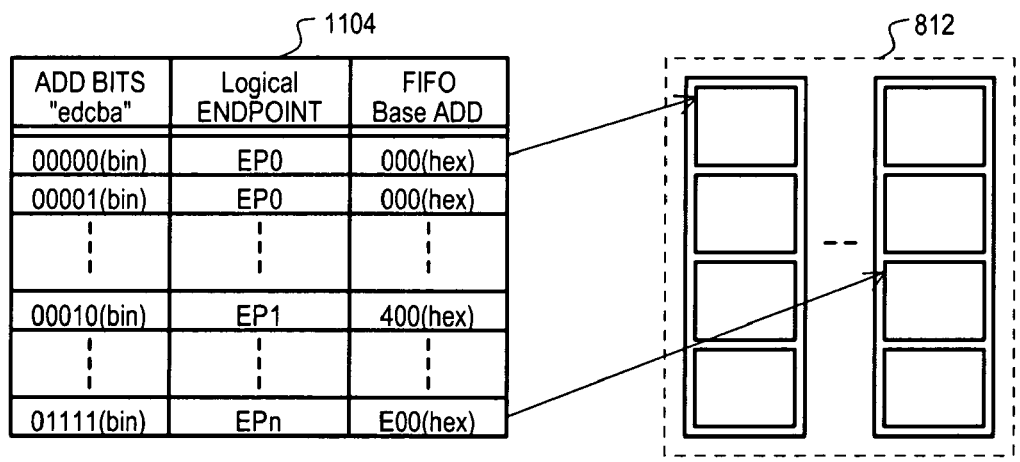
FIG. 11B
```
0   switch (edcba)
1       case [01000(bin)]
2           Target EP = EP1
3           Notify H-Port
4       case [01100(bin)]
5           Target EP = EP4
6           Notify S-Port
7           Address Offset = ADD[bytes 2:0]
```
FIG. 12

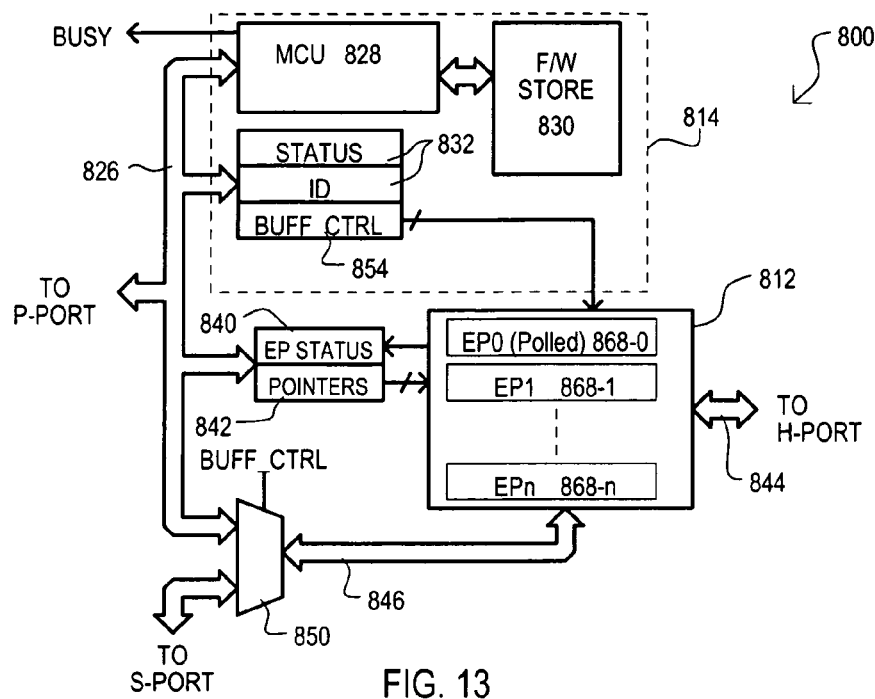

FIG. 13

| | |
|---|---|
| 0 | case CMD_Data = "Page Read" |
| 1 | assert BUSY (R/B#) |
| 2 | If Target EP Status = Not Ready |
| 3 | If ADD_DATA indicates H-Port Access |
| 4 | write request to polled EP |
| 5 | if H-Port writes to Target EP in time |
| 6 | set Target EP Status = Ready |
| 7 | else timeout (or retry or error) |
| 8 | If ADD_DATA indicates S-Port Access |
| 9 | configure Target EP as read target for P-Port |
| 10 | enable MUX path from S-Port to Target EP |
| 11 | if S-Port writes to Target EP in time |
| 12 | set Target EP Status = Ready |
| 13 | disable MUX path from S-Port to Target EP |
| 14 | else timeout (or retry or error) |
| 15 | If Target EP Status = Ready |
| 16 | Target EP Pointer = ADD_DATA |
| 17 | enable MUX path from S-Port to Target EP |
| 18 | de-assert BUSY (R/B#) |
| | {P-Port PROCESSOR READS FROM TARGET FIFO} |

FIG. 14

```
1  case CMD_Data = "Column Address Switch Data Out"
2      assert BUSY (R/B#)
3      If Target EP Status = Not Ready
4          Error
5      If Target EP Status = Ready
6          Target EP Pointer = Target EP Pointer + (New Column ADD)
7          enable MUX path from P-Port to Target EP
8          de-assert BUSY (R/B#)
           {P-Port PROCESSOR READS FROM TARGET EP}
```

FIG. 15

```
0  case CMD_Data = "Page Program"
1      If Target EP Status = Not Ready
2          Retry (or Error or switch to new Target EP)
3      If Target EP Status = Ready
4          Target EP Pointer = ADD_DATA
5          enable MUX path from P-Port to Target EP
           {P-Port PROCESSOR WRITES TO TARGET EP}
6          If Target EP indicates write complete in time
7              assert BUSY (R/B#)
8              write STATUS register (Program Successful)
9          else
10             assert BUSY (R/B#)
11             write STATUS register (Program Not Successful)
12         de-assert BUSY (R/B#)
```

FIG. 16

```
0  case CMD_Data = "Column Address Switch Data In"
1      If Target EP Status = Not Ready
2          Retry (or Error or switch to new Target EP)
3      If Target EP Status = Ready
4          Target EP Pointer = Target EP Pointer + (New Column ADD)
5          enable MUX path from P-Port to Target EP
           {P-Port PROCESSOR WRITES TO Target EP}
6          If Target EP returns write complete in time
7              assert BUSY (R/B#)
8              write STATUS register (Program Successful)
           else
9              assert BUSY (R/B#)
10             write STATUS register (Program Not Successful)
11         de-assert BUSY (R/B#)
```

FIG. 17

| 0 | case CMD_Data = "Block Erase" |
|---|---|
| 1 | assert BUSY (R/B#) |
| 2 | If ADD_DATA indicates block erase at H-Port |
| 3 | write erase request to polled EP |
| 4 | If H-Port returns result data in time |
| 5 | write STATUS register (according to result data) else |
| 6 | write STATUS register (Erase Not Successful) |
| 7 | If ADD_DATA indicates block erase at S-Port |
| 8 | convert received block address to S-Port device address(es) |
| 9 | output erase command and address data at S-Port |
| 10 | If S-Port returns result data in time |
| 11 | write STATUS register (according to result data) |
| 12 | else |
| 13 | write STATUS register (Erase Not Successful) |
| 14 | de-assert BUSY (R/B#) |

FIG. 18

```
case CMD_Data = "Read Status"
    output STATUS data from STATUS register on I/O bus
```

FIG. 19

```
case CMD_Data = "Read ID"
    output ID data from STATUS register data on I/O bus
```

FIG. 20

```
case CMD_Data = "Reset"
    activate Reset Circuit of Controller
```

FIG. 21

| | |
|---|---|
| 0 | case P-Port Input = "Boot Processor" |
| 1 | If Boot EP Status = Not Ready |
| 2 | If Boot Data indicates Boot from H-Port |
| 3 | write request to polled EP |
| 4 | if H-Port writes to Boot EP in time |
| 5 | set Boot EP Status = Ready |
| 6 | else timeout (or retry or error) |
| 7 | If Boot Data indicates Boot From S-Port |
| 8 | configure EP FIFO as read target for S-Port |
| 9 | enable MUX path from S-Port to Boot EP |
| 10 | if S-Port writes to Boot EP in time |
| 11 | set Boot EP Status = Ready |
| 12 | disable MUX path from S-Port to Boot EP |
| 13 | else timeout (or retry or error) |
| 14 | If Boot EP Status = Ready |
| 15 | FIFO Pointer = Boot EP ADD |
| 16 | enable MUX path from P-Port to Boot EP |
| 17 | assert Processor notification (Int, DRQ) |
| | {P-Port PROCESSOR READS OS FROM BOOT EP} |

FIG. 22

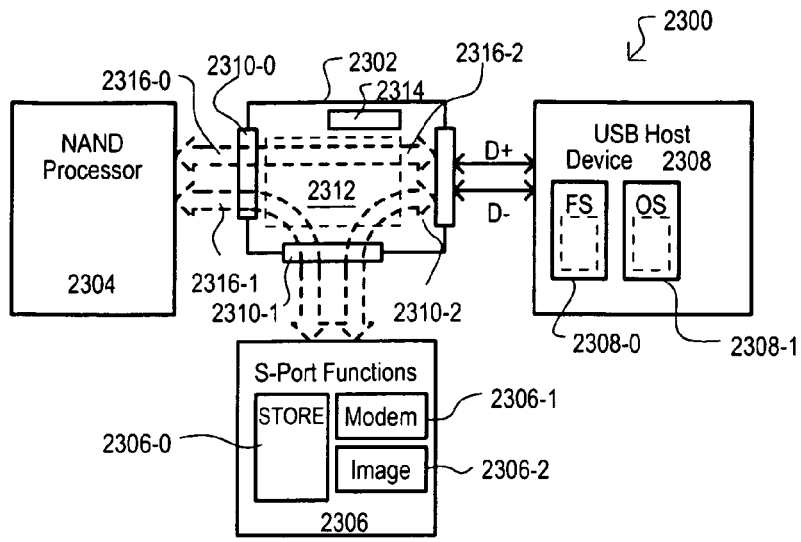

FIG. 23

| PAGE PROCESSOR Output | | System Operation |
|---|---|---|
| CMD | ADD[h:l] | |
| Page Read | 00000 | Read Page of Data from First Location/File of H-Port Device |
| Page Read | 00001 | Read Page of Data from Second Location/File of H-Port Device |
| Page Read | 00100 | Read Page of Data from Location of S-Port Device |
| CASDO | 00XXX | Read Page of Data from Location of Existing Valid Buffer |
| Page Program | 00000 | Write Page of Data to First Location/File of H-Port Device |
| Page Program | 00001 | Write Page of Data to Second Location/File of H-Port Device |
| Page Program | 00100 | Write/Program Page of Data to Location of S-Port Device |
| CASDI | 00XXX | Write Page of Data to Location of Existing Valid Buffer |
| Block Erase | 00000 | Emulate Erase for Page of Data in First Location/File of H-Port Device |
| Block Erase | 00001 | Emulate Erase for Page of Data in Second Location/File of H-Port Device |
| Block Erase | 00100 | Erase/Emulate Erase for Page of Data in Second Location/File of H-Port Device |
| Special 1 | 00000 | Call for First Function of H-Port Device |
| Special 2 | 00000 | Call for Second Function H-Port Device |
| Special 3 | 00100 | Call for First Function of P-Port Device |
| Special 4 | 00100 | Call for Second Function of P-Port Device |
| Special 5 | 10000 | Call Function of H-Port (STALL, NAK, ACK, etc.) |
| Special 6 | 11000 | Call Function of S-Port (Set I/F type to MMC+) |

FIG. 24

BRIDGE DEVICE WITH PAGE-ACCESS BASED PROCESSOR INTERFACE

This application claims the benefit of U.S. Provisional Patent Application filed on Aug. 24, 2007, and having Ser. No. 60/957,946, the contents of which are incorporated by reference herein.

TECHNICAL FIELD

The present invention relates generally to devices and methods that provide communication paths between devices having different types of interfaces, and more particularly to devices for bridging a page-access based processor with non-page access devices.

BACKGROUND OF THE INVENTION

High density storage technologies, such as NAND flash memory, have given rise to processors designed to interface with such storage devices. For example, a "NAND" type processor, can have an interface designed to communicate with NAND storage devices according to command and address data having a predetermined sequence and format.

In most cases, the physical arrangement of storage cells in a NAND flash memory device is not conducive to rapid or completely random access. As a result, NAND devices typically load data into an onboard buffer, not formed from NAND flash memory cells, for subsequent read out (in the case of a read command), or subsequent programming into such NAND flash memory cells (in the case of a program command). Typically, the onboard buffer is one or more page buffers for storing a page of data. Conventionally, a page can be as small as 512 bytes or as large as 2048 bytes (excluding error correction data). In a NAND flash memory device, a page is the minimum accessible data size that can be transferred between a page buffer and the corresponding NAND memory cell array.

While NAND processors can provide efficient access to NAND based storage devices, such a particular interface type can limit the applications for such processors to only accessing NAND storage devices, or specialized devices closely associated with NAND storage devices.

One approach that can provide some additional functionality to a NAND type interface is the extension to the Secure Digital (SD) interface, called SD input/output (SDIO). A device manufactured according to the SDIO standard can allow an SDIO circuit card to provide input/output (I/O) functions in addition to those provided by NAND storage when attached to an SDIO aware host. One example of a conventional SDIO system is shown in FIG. 25, and designated by the general reference character 2500. Conventional system 2500 can include an SD host controller 2502 that can be connected to either NAND based SD Memory Cards 2504 or SDIO Cards 2506, by way of SD host connector 2508. A host controller 2502 can access SD cards 2502 utilizing SD memory card driver 2510 and SD memory card applications 2512 accessible via a common SD bus driver 2514. Similarly, host controller 2502 can access non-storage functions of SDIO cards 2506 utilizing SDIO card driver 2516 and SDIO card applications 2518, also accessible via a common SD bus driver 2514.

A conventional approach like that of FIG. 25, can allow an SD controller 2502 to access functions in addition to storage. However, such additional functions are enabled by ensuring all devices comply with a same standard.

BRIEF DESCRIPTION OF THE DRAWINGS

FIGS. 9A and 9B show portions of an instruction translation operation that can be executed by a bridge device like that of FIG. 8.

FIG. 10A-0 is a timing diagram showing a first example of a command/address sequence that can be received by bridge device like that of FIG. 8. FIG. 10A-1 shows one example of port register values for the sequence of FIG. 10A-0.

FIG. 10B-0 is a timing diagram showing a second example of a command/address sequence that can be received by bridge device like that of FIG. 8. FIG. 10B-1 shows one example of port register values the sequence of FIG. 10B-0.

FIG. 11A is a diagram showing one example of an address value that can be received by a bridge device like that of FIG. 8. FIG. 11B shows how selected portions of a received address can be assigned to logical endpoints by a bridge device.

FIG. 12 shows one example of a bridge device processing a portion of an address value to assign a logical endpoint in response to a particular command.

FIG. 13 is a block schematic diagram showing one particular configuration for a portion of a bridge device of FIG. 8

FIG. 14 shows one example of operations that can be executed by a bridge device in response to a Page Read command.

FIG. 15 shows one example of operations that can be executed by a bridge device in response to a Column Address Switch (for Read) command.

FIG. 16 shows one example of operations that can be executed by a bridge device in response to a Page Program command.

FIG. 17 shows one example of operations that can be executed by a bridge device in response to a Column Address Switch (for Program) command.

FIG. 18 shows one example of operations that can be executed by a bridge device in response to a Block Erase command.

FIG. 19 shows one example of operations that can be executed by a bridge device in response to a Read Status command.

FIG. 20 shows one example of operations that can be executed by a bridge device in response to a Read ID command.

FIG. 21 shows one example of operations that can be executed by a bridge device in response to a Reset command.

FIG. 22 shows one example of operations that can be executed by a bridge device in response to a Boot Processor command.

FIG. 23 is as block schematic diagram of a system according to another embodiment.

FIG. 24 shows operations that can be performed by a system like that of FIG. 23 in response to particular command/address combinations.

DETAILED DESCRIPTION

Various embodiments will now be described in detail that show methods and devices that can allow for a page access based processor (herein after a PA processor) to access non-page access memory devices and functions using both standard page access commands (such as page read, page program and/or page erase), as well as custom commands. Such an arrangement can expand the functionality of a system that includes a PA processor, by enabling such a processor to communicate with devices and functions other than those of its intended interface.

In particular embodiments, a single "bridge" integrated circuit device can include a processor interface that can be configured to communicate with the PA processor, and enable communication paths between the processor interface and one or more other differently configured interfaces.

Figure 1:
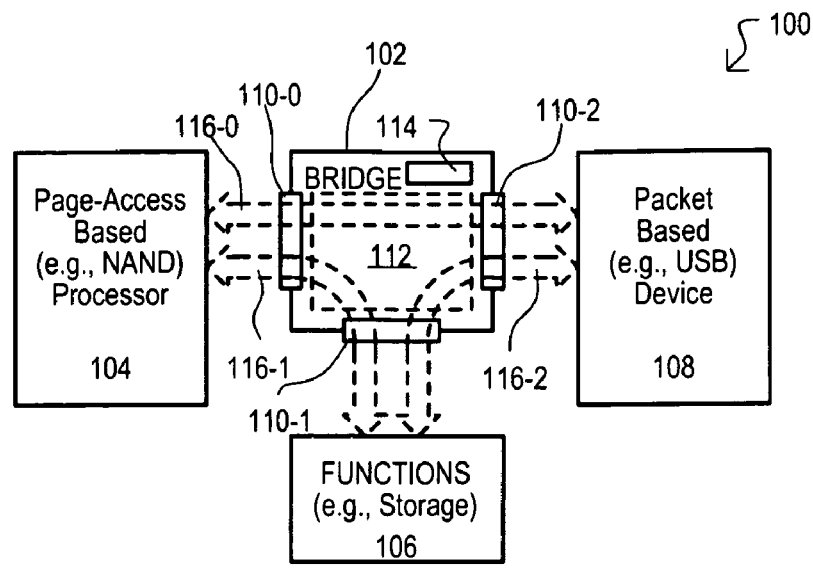
FIG. 1 shows a block diagram of a system according to one embodiment of the invention.

Referring now to FIG. 1, a system according to a first embodiment is shown in a block diagram and designated by the reference character 100. A system 100 can include a bridge device 102, a PA processor 104, a second device 106, and a third device 108. A bridge device 102 can include a first interface (I/F) 110-0, a second I/F 110-1, a third I/F 110-2, a switchable communication path 112, and a controller circuit 114. A first interface I/F 110-0 can be a configurable processor I/F that can be configured to communicate according to any one of multiple processor types. At least one such configuration can be for compatibility with a PA processor. In such a configuration, a first interface I/F 110-0 can generate inputs and outputs expected in a page based access memory device. As but one example, first interface I/F 110-0 can be configured as a NAND processor interface, and thus appear (i.e., accept inputs and provide outputs) to an external processor as a NAND storage device.

A second I/F 110-1 can enable communication via a separate channel different from that of the first and third I/Fs (110-0 and 110-2). A second I/F 110-1 can be a storage I/F compatible for accessing storage devices. As but one example, a second I/F 110-1 can be a NAND I/F for issuing commands to and enabling data transfers with a NAND storage device. This is in contrast with the example noted above in which a first I/F 110-0 can be a NAND processor I/F, which receives commands from an external processor.

A third I/F 110-2 can enable communication via a separate channel different from that of the first and second I/Fs (110-0 and 110-1). A third I/F 110-2 can be a packet access based I/F, compatible for communicating with a device according to a packet based protocol. As but one example, a third I/F 110-2 can be a universal serial bus (USB) I/F for communicating with an external device according to the USB protocol.

A switchable communication path 112 can be configured to provide communication paths between of first, second and third interfaces (110-0 to 110-2). More particularly, a switchable communication path 112 can enable a first configurable communication path 116-0 that enables data transfers between PA processor 104 and second device 108 via first I/F 110-0 and third I/F 110-2, or enable a second configurable communication path 116-1 that enables data transfers between PA processor 104 and first device 106 via first I/F 110-0 and second I/F 110-1, or enable a third configurable communication path 116-2 that enables data transfers between first device 106 and second device 108 via second I/F 110-1 and third I/F 110-2.

A controller circuit 114 can control the configuration of first I/F 110-0, switchable communication path 112, and can serve as translator, for translating command and address data received at first I/F 110-0 into configuration information.

Having described the general components and sections of a system 100, particular operations of the system will now be described.

Referring still to FIG. 1, a PA processor 104 can issue a page-access base command to bridge device 102. Such data can be received at first I/F 110-0. In response to such data, controller circuit 114 can configure either first communication path 116-0 or second communication path 116-1. In the latter case, configuring first communication path 116-0 can enable PA processor 104 to access storage locations within, or functions executable by, a second device 108 using page based access commands. In this way, while a PA processor 104 may be designed to access page based storage devices according to a limited standard, the functions accessible by such a PA processor 104 can be expanded to other devices and standards. In a similar fashion, configuring second communication path 116-1 can enable PA processor 104 to access storage locations within, or functions executable by, a first device 106 using page based access commands.

In this way, a system can allow a PA processor to access functions and storage locations beyond those of a page-based access storage device. Preferably, a bridge device is a single integrated circuit device. Such an arrangement can allow the bridge device to be connected to existing PA processors to allow easy expansion of PA processor functionality.

Figure 2:
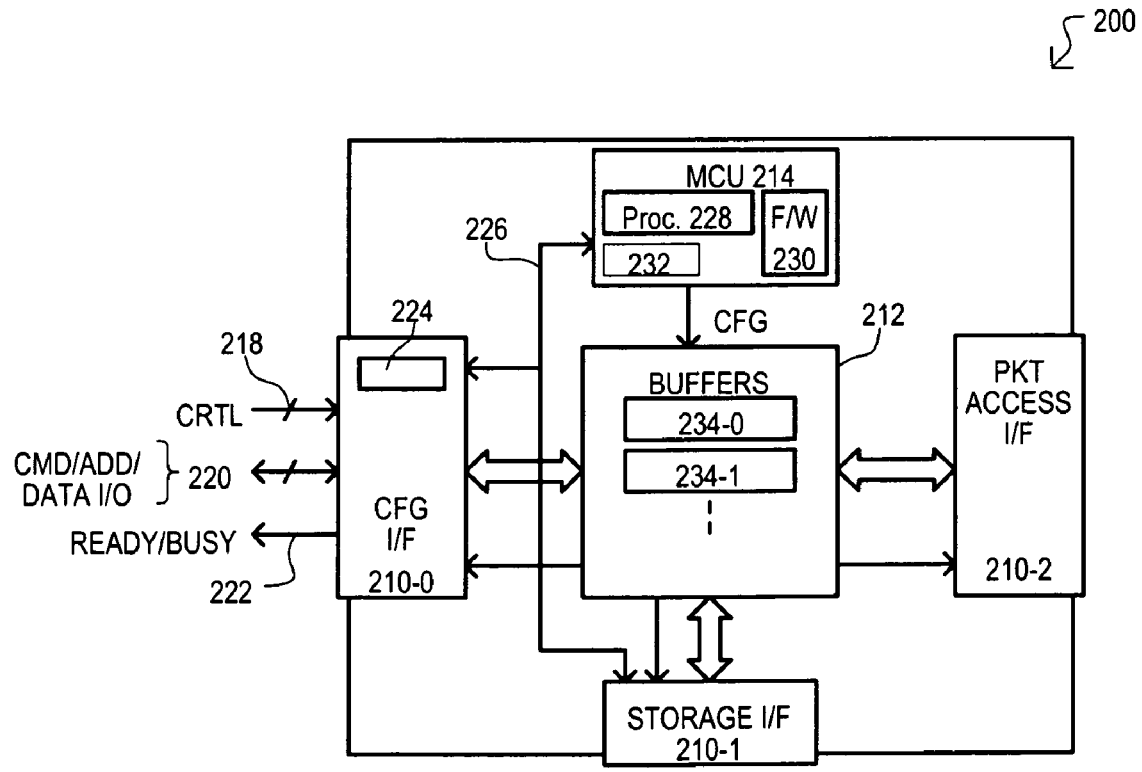
FIG. 2 is a block schematic diagram of a bridge device that can be included in the system of FIG. 1, according to an embodiment.

Referring now to FIG. 2, a bridge device according to an embodiment is shown in a block schematic diagram, and designated by the general reference character 200. In one very particular arrangement, a bridge device 200 can correspond to that shown as 102 in FIG. 1.

A bridge device 200 can include first, second and third I/Fs (210-0, 210-1, 210-2, respectively), switchable communication path 212, and controller circuit 214. A first interface 210-0 can include control inputs 218, a command/address/data input/output (I/O) bus 220, an indicator output 222, and an I/F register 224. Control inputs 218 can receive signals (from a PA processor) for controlling the transfer of data on I/O bus 220. As but one very particular example, control inputs 218 can receive a write enable (WE) signal, to signify when data is to be input to first I/F 210-0 and/or a read enable (RE) signal, to signify when data is to be read from first I/F 210-0. I/O bus 220 can provide an input path for command data, address data, and input data (e.g., program data). In addition, I/O bus 220 can provide an output path for output data (e.g., read data). An indicator output 222 can provide an indication on the status of a command issued to first I/F 210-0. For example, indicator output 222 can output one value (READY) when communications can be received at first I/F 210-0, or another value (BUSY), when communications cannot be can be received at first I/F 210-0. An I/F register 224 can store command and address data received on I/O bus 220.

First I/F 210-0 can be connected to controller circuit 214 by a controller control/data path 226. Control/data path 226 can allow first I/F 210-0 to provide notifications to controller circuit 224, and allow controller circuit 224 to access data stored in first I/O 210-0, including data stored in I/F register 224. Control/data path 226 can also enable controller circuit 224 to control second I/F 210-1.

A controller circuit 224 can include a processor 228, instruction memory 228, and status register 232. A processor 226 can execute instructions stored in instruction memory 228 in response to predetermined inputs. For example, in response to inputs from first I/F 210-0, a controller circuit 224 can execute a predetermined sequence of instructions. In addition, controller circuit 224 can provide configuration data to switchable communication path 212 to thereby enable and control communication paths between first I/F 210-0 and either of second or third I/Fs (210-1 or 210-2). Status register 232 can store data representing the status of operations being executed by bridge device 200. In addition, status register 232 can store data identifying devices connected to second I/F 210-1 and/or third I/F 210-2.

A switchable communication path 212 can include a number of buffers (two shown as 234-0 and 234-1). According to control signals generated by controller circuit 224, buffers (234-0 and 234-1) can be connected to any of the first, second or third I/Fs (210-0 to 210-2).

In the particular example of FIG. 2, a second I/F 210-1 can be a storage interface for accessing a storage device. According to configuration data generated by controller circuit 214, a second I/F 210-1 can be connected to any of multiple buffers (e.g., 210-0, 210-1) by operation of switchable communication path 212.

In the example shown, a third I/F 210-2 can be a packet based I/F for accessing devices based on a predetermined packet based protocol. As in the case of the first and second I/Fs, according to configuration data generated by controller circuit 224, a third I/F 210-2 can be connected to any of multiple buffers (e.g., 210-0, 210-1).

Having described one example of a bridge device 200 in FIG. 2, various examples of operations executable by such a bridge device will now be described with reference to FIGS. 3A to 7. FIGS. 3A to 7 show the same bridge device as FIG. 2, and so include the same reference characters.

Figure 3A:
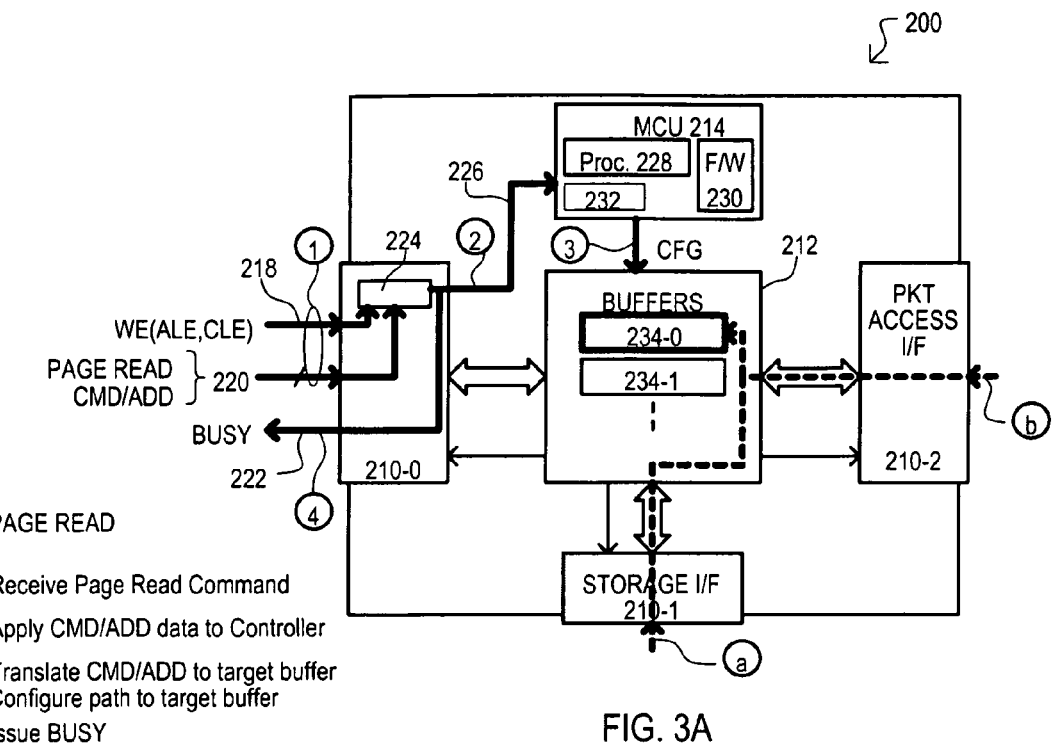
FIGS. 3A and 3B show a Page Read operation that can be executed by the bridge device of FIG. 2.
Figure 3B:
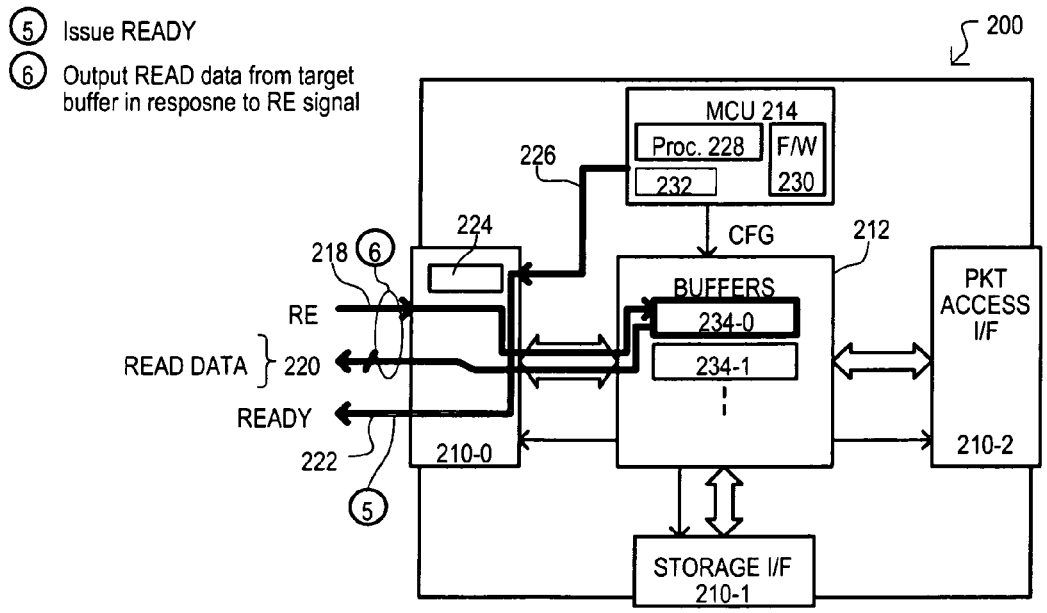

Referring to FIGS. 3A to 3B, one example of a Page Read operation is shown in a sequence of block diagrams. Various steps are represented by circled characters. These steps will be described below:

Reference is first made to FIG. 3A.

Step (1): A first I/F 210-0 can receive data for a Page Read command. Such data can include command data and read address data received on the same I/O bus 220. Such Page Read command data can be accompanied by one or more control signals to signify timing of valid data on I/O bus 220. In the example shown, such a control signal can be a write enable (WE) signal. Preferably, control signals can also include a command latch enable (CLE) signal and an address latch enable (ALE) signal to distinguish between command and address data. Data for the Page Read command can be stored by first I/F 210-0 in I/F register 224. For example, local hardware processing (i.e., circuitry of the first I/F 210-0) of the command data can occur to store such data in I/F register 224.

Step (2): In response to command data being received and stored at I/F register 224, controller circuit 214 can access I/F register 224 to read out the command/address data. Depending upon the data read, controller circuit 214 can issue configuration data for switchable communication path 212. Even more particularly, according to predetermined configuration data, controller circuit 214 can utilize one or more particular portions of command/address data in I/F register 224 as an index to a routine in instruction memory 230. Such a routine can generate configuration data according to the particular type of command. Further, according to data read from I/F register 224 controller circuit 214 can identify a "target" buffer (e.g., 234-0, 234-1) of the command. That is, controller circuit 214 can map a received read address value to a physical buffer address.

Step (3): In response to detected command data, controller circuit 214 can generate configuration data for a read operation from a particular "target" buffer (in this case 234-0). Such a step can include writing to a configuration register, as but one example. Such configuration data can configure switchable communication path to enable a communication path from first I/F 210-0 to the target buffer 234-0.

Step (4): In response to received command/address data, indicator output 222 can assert a BUSY indication. In one arrangement, such a BUSY indication can be initially generated by controller circuit 214, and passed directly, or by intervening circuitry, to first I/F 210-0. In other arrangements, such a BUSY indication can be generated locally. That is, circuitry of the first I/F 210-0 can locally interpret received command data, and generate a BUSY indication when appropriate.

FIG. 3A also shows a step (a) and a step (b). Either of these steps can be executed prior to or after step (1) noted above, to place read data into target buffer 234-0.

Step (a): Data can be transferred from second I/F 210-1 to target buffer 234-0. In one arrangement, step (a) can occur prior to step (1). That is, according to a previous operation, read data for the Page Read command of step (1) is already loaded into the target buffer. In another arrangement, and as will be described in more detail below, a step (a) can occur after step (1). That is, in response to a particular Page Read command, a device connected to second I/F 210-1 can be accessed, and data written to the target buffer. It is understood that read data received via second I/F 210-1 can be data from a page-access type memory device operating according to a different standard than that of a PA processor connected to first interface 210-1.

Step (b): As an alternatively to step (a), data can be transferred from third I/F 210-2 to target buffer target buffer 234-0. A step (b) can also be executed prior to step (1) (i.e., previous operation) or after step (1) (in response to a Page Read command). It is understood that read data received via second I/F 210-1 can be data from a non-memory device.

Reference is now made to FIG. 3B. After the appropriate read data has been stored in the target buffer 234-0, and switchable communication path 212 has been enabled, steps (5) and (6) can occur.

Step (5): Controller circuit 214 can generate a "READY" indication on indicator output 222 to inform an attached PA processor that read operations can commence.

Step (6): Control signals for accessing data can be received on control input 218. Such control signals can be applied to the target buffer 234-0 to sequentially place read data stored in the target buffer 234-0 onto I/O bus 220. In the particular example of FIG. 3B, such control signals can include a read enable (RE) signal.

In this way, a Page Read operation can be executed by bridge device.

Figure 4A:
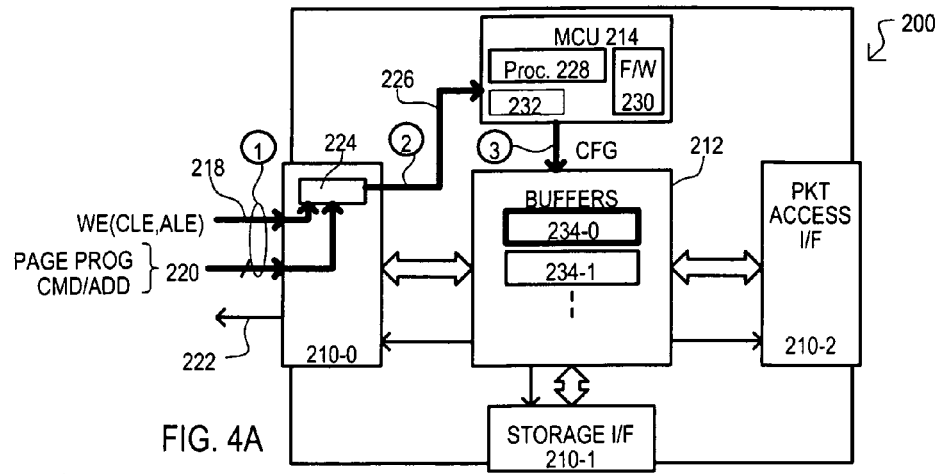
FIGS. 4A to 4C show a Page Program operation that can be executed by the bridge device of FIG. 2.
Figure 4B:
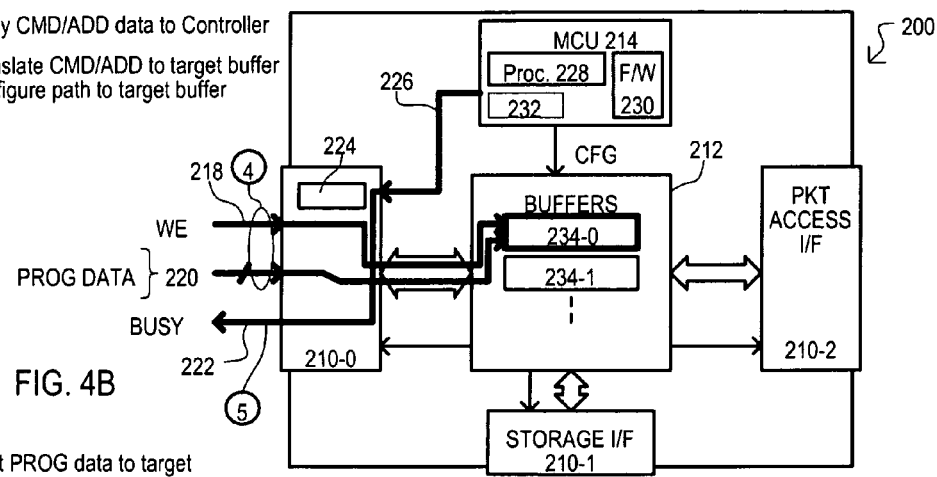
Figure 4C:
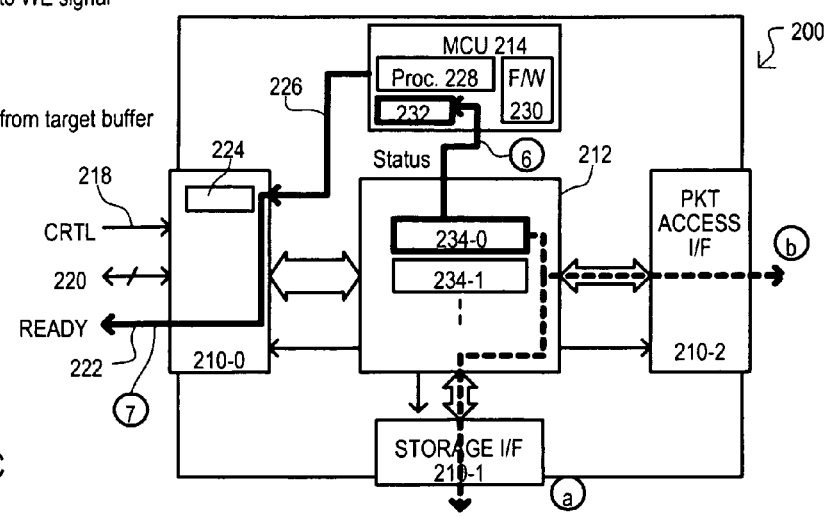

Referring to FIGS. 4A to 4C, one example of a Page Program operation is shown in a sequence of block diagrams. Various steps are represented by circled characters, are described below:

Reference is first made to FIG. 4A.

Step (1): A first I/F 210-0 can receive data for a Page Write command. Such a step can include the same general operations as Step (1) for a Page Read command.

Step (2): In response to command data being received and stored at I/F register 224, controller circuit 214 can access I/F register 224 to read out the command/address data.

Step (3): In response to detected command/address data, controller circuit 214 can generate configuration data for a write operation to a particular "target" buffer (in this case 234-0). Such configuration data can configure switchable communication path to enable a communication path from first I/F 210-0 to the target buffer 234-0.

FIG. 4B will now be described.

Step (4): Control signals for programming (in this case writing) data can be received on control input 218. Such control signals can be applied to the target buffer 234-0. At the same time, data for the program operation can be received on I/O bus 220 and forwarded to the target buffer. In the particular example of FIG. 4A, such a control signal can be a WE signal.

Step (5): Following the writing of Page Program data to target buffer 234-0, a BUSY indication can be asserted on indicator output 222. Such an indication can be generated in the same manner as that described in step (4) of FIG. 3A above.

FIG. 4C will now be described.

Step (6): According to results from a writing of program data to a target buffer, status information can be generated. In the particular example of FIG. 4C, status information can be written to status register 232. As but one example, status information can indicate if an operation initiated by the Page Program command is successfully completed, is still in progress, or has failed. In one arrangement, such status information can be based on a transfer from first I/F 210-0 to the target buffer 234-0, and no other subsequent operations. However, in other arrangements, such status information can be based not only on a transfer of data to the target buffer, but also on the subsequent transfer of data from the target buffer to another device via second I/F 210-1 or third I/F 210-2. Still further, such status information can be based not only on a transfer of data to some external device, but one such an external device returning (or not returning) an acknowledgement via the second I/F 210-1 or third I/F 210-2, that such data was successfully received.

Step (7): Controller circuit 214 can generate a "READY" indication on indicator output 222, to inform an attached PA processor that program operations are complete (success or failure of such operations can be determined with a Read Status operation described below).

FIG. 4C also shows a step (a) and a step (b). Either of these steps can be executed prior to or after step (6) noted above.

Step (a): Data can be transferred from target buffer 234-0 to second I/F 210-1. In one arrangement, step (a) can occur prior to step (6). That is, the execution of step (6) can be dependent upon step (a). More particularly, status information will not be generated until data is subsequently accessed via another interface (i.e., 210-1 or 210-2). In contrast, in other arrangements, step (a) could also occur after step (6), with status information being dependent only upon a successful write of data to target buffer 234-0.

Step (b): Data can be transferred from target buffer 234-0 to third I/F 210-1. This step can be subject to the same variation as step (a) directly above.

In this way, a Page Read command and/or Page Program command can be used to transfer data between a PA processor connected to one interface (e.g., 210-1) and a non-page access device (i.e., via third I/F 210-2), or a page access device operating according to a different standard (i.e., via second I/F 210-2). Such an arrangement can greatly expand functions accessible by a PA processor, as such a PA processor is otherwise restricted to interfacing only with particular page-access memory devices, or to a small set of devices manufactured to one particular standard.

Figure 5A:
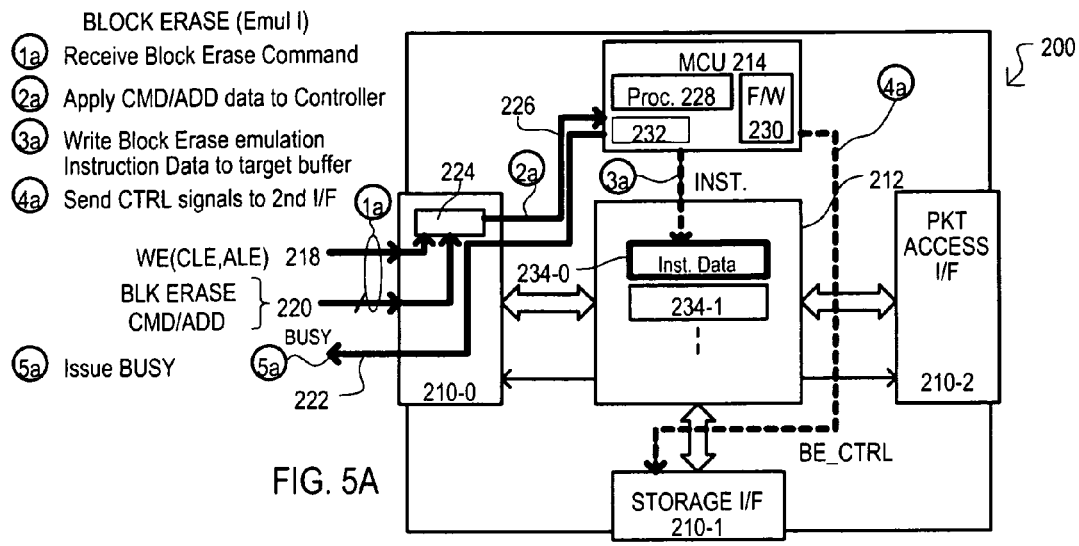
FIGS. 5A to 5C show Block Erase operations that can be executed by the bridge device of FIG. 2.
Figure 5B:
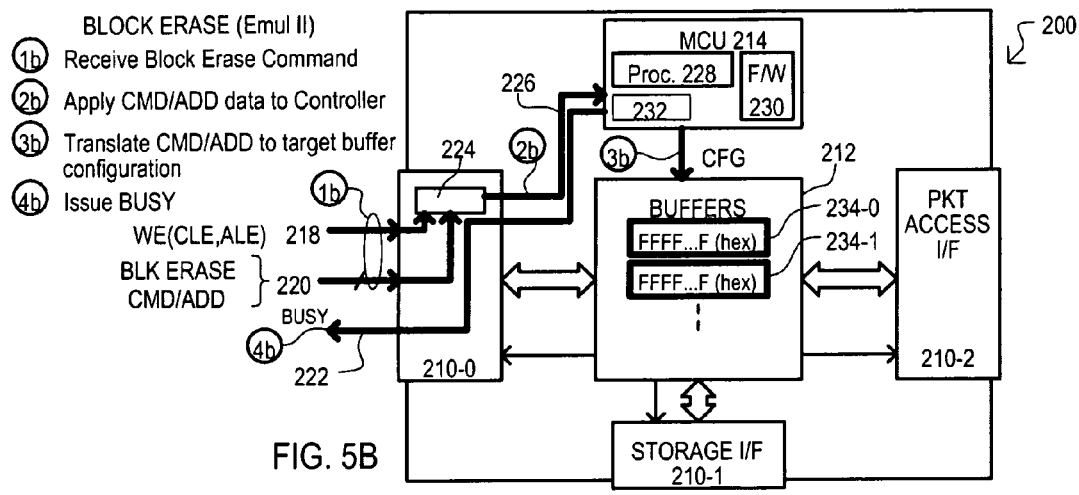
Figure 5C:
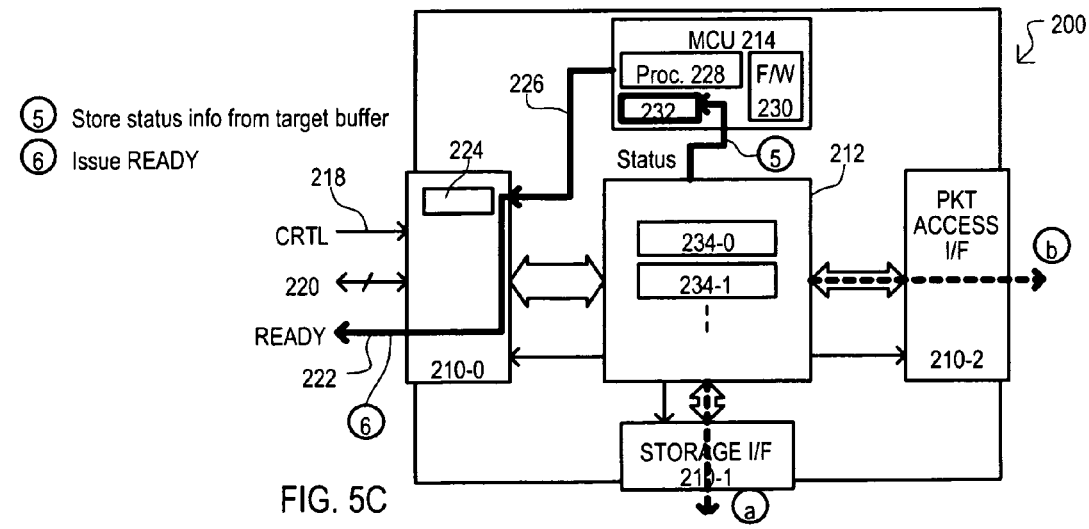

Referring to FIGS. 5A to 5C, examples of Block Erase operations are shown in a sequence of block diagrams. Various steps represented by circled characters are described below: When a Block Erase command is issued to a NAND based flash memory device, a block of addressable locations (a block being composed of multiple pages) can be erased. Typically, such an erasure results in all bit values being set to "1". However, according to embodiments described herein, with the expanded functionality provided by a bridge device 200, a Block Erase operation can be directed to a target device or memory area that is not flash EEPROM based. Consequently, operations executed in response to such commands can emulate an erase operation.

FIG. 5A shows a first example of "emulating" a Block Erase operation. Reference is now made to FIG. 5A.

Step (1a): A first I/F 210-0 can receive data for a Block Erase command. Such a step can include the same general operations as Step (1) for a Page Read command.

Step (2a): In response to command data being received and stored at I/F register 224, controller circuit 214 can access I/F register 224 to read out the command data. In response to command data, a controller circuit 214 can map a received block erase address to either a target buffer (in this example 234-0) or a target block address of a memory in another corresponding device. However, unlike Page Read or Page Program operations, a communication path need not be formed between first I/F 210-0 and target buffer 234-0.

Step (3a): This step shows a first possible operation that can be executed in response to a Block Erase command. It is assumed that target buffer 234-0 has been identified. In response to Block Erase command data being received, controller circuit 214 can write predetermined instruction data to the target buffer 234-0. Such data can direct an externally connected device (i.e., a separate device connected to the bridge device 200) to emulate a block erase operation. As but one example, such instruction data can direct an operating system to designated a particular range of memory locations as no longer storing valid data. As but another example, such instruction data can result in commands being executed on a file system resident on such an external device.

Step (4a): This step shows an alternate operation to that of Step (3a). In this operation, it is assumed that a corresponding target block address has been identified. In response to the Block Erase command data being received, controller circuit 214 can apply predetermined control signals and address information to second I/F 210-1 to execute a block erase at the target block address. It is noted that such signals can be compatible with the standard of those received at first I/F 210-0, or can be generated according to an entirely different standard. The latter case can advantageously enable a PA processor to execute block erases on flash devices that would otherwise be incompatible with the PA processor.

Step (5a): Following receipt of a Block Erase command, a BUSY indication can be asserted on indicator output 222. Such an indication can generated in the same manner as that described in step (4) of FIG. 3A above.

Reference will now be made to FIG. 5B.

Step (1b): This step can be the same as step (1a) described above for FIG. 5A.

Step (2b): In response to command data being received and stored at I/F register 224, controller circuit 214 can access I/F register 224 to read out the command data.

Step (3b): In response to command and address data, controller circuit 214 can issue configuration data and/or execute predetermined commands that result in one or more buffers (in this case 234-0 and 234-1) storing erase state data (in this case the value "1" in all bit locations). Such a step can include the sequential writing of 1s to indicated buffer locations or can enable circuits inherent in the buffers that result in 1s being either stored, or automatically output from the buffers.

Step (4b): Following receipt of a Block Erase command, a BUSY indication can be asserted on indicator output 222. Such an indication can generated in the same manner as that described in step (4) of FIG. 3A above.

Reference will now be made to FIG. 5C. Operations shown in FIG. 5C can occur after step (1a) of FIG. 5A or step (1b) of FIG. 5B.

Step (5): According to results from a Block Erase operation, status information can be generated. In the particular example of FIG. 5C, status information can be written to status register 232. In a similar fashion to the Page Program operation described above, status information can indicate if an operation initiated by the Block Erase command is successfully completed, is still in progress, or has failed. In one arrangement, such status information can be based on a transfer of instruction data from controller circuit 214 to a target buffer 234-0 (e.g., step (3a) of FIG. 5A), or the issuing of control signals to a second interface (step (4a) of FIG. 5A), or the successful configuring of one or more target buffers (step (3b) of FIG. 5B). In another arrangement, such status information can be based transfer of data from the target buffer to another device via second I/F 210-1 or third I/F 210-2. In yet another arrangement, such status information can be based on receiving (or not receiving) an acknowledgement from a device connected to the second I/F 210-1 or third I/F 210-2.

Step (6): Controller circuit 214 can generate a "READY" indication on indicator output 222, to inform an attached PA processor that erase operations are complete (success or failure of such operations can be determined with a Read Status operation described below).

FIG. 5C also shows a step (a) and a step (b). Either of these steps can be executed after step (3a) or (4a) of FIG. 5A, or step (3b) of FIG. 5B.

Step (a): Instruction data, or erase equivalent data can be transferred from target buffer(s) to second I/F 210-1.

Step (b): Instruction data or erase equivalent data can be transferred from target buffer(s) to third I/F 210-1.

In this way, a Block Erase command can be emulated by providing predetermined instruction data, write data, or write commands to an interface other than that which receives the Block Erase command. Such an arrangement can allow operations to be executed on non-page accessed based devices in response to Block Erase commands.

Figure 6A:
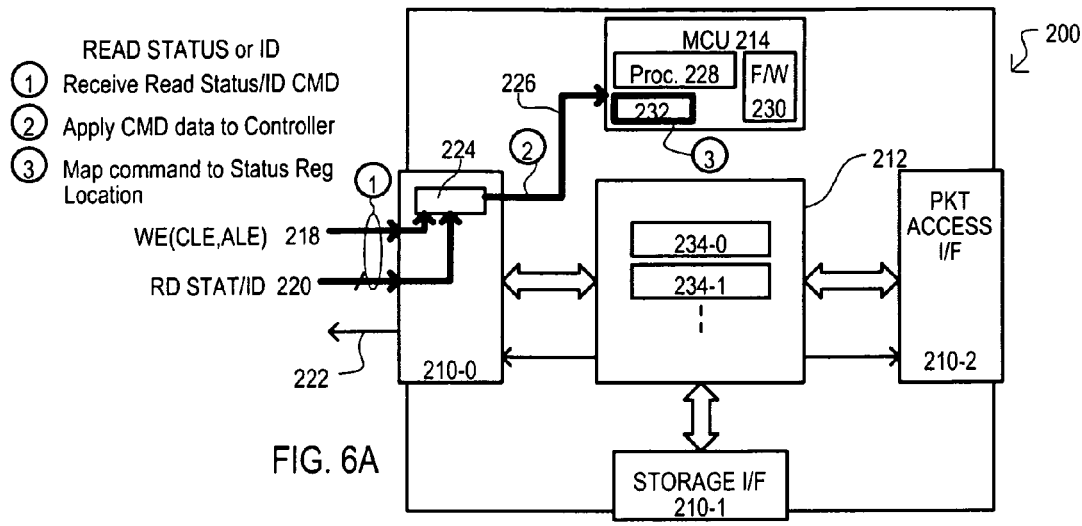
FIGS. 6A and 6B show Read Status and Read ID operations that can be executed by the bridge device of FIG. 2.
Figure 6B:
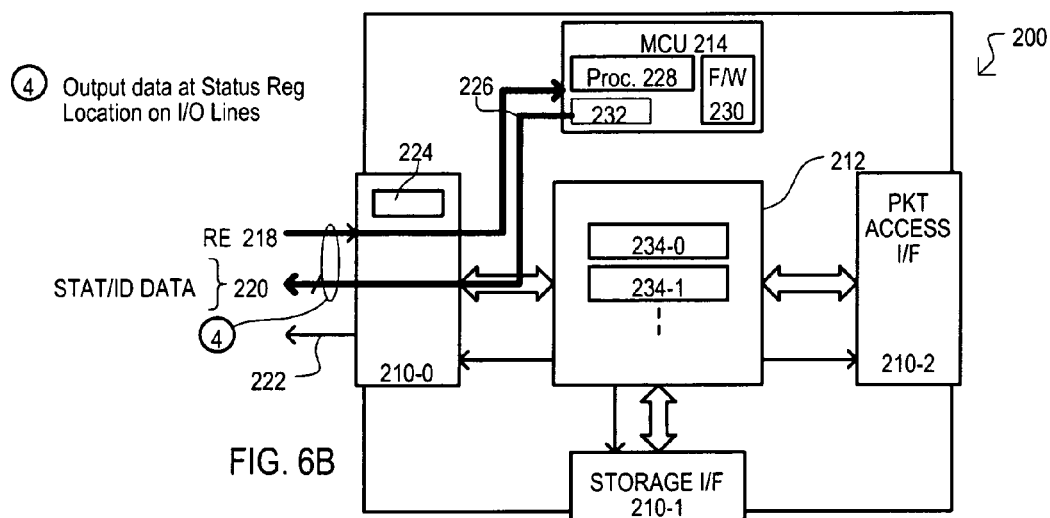

Referring to FIGS. 6A and 6B, one example of a Read Status or READ ID operation is shown in a sequence of block diagrams. Various steps are represented by circled characters, are described below:

Reference is first made to FIG. 6A.

Step (1): A first I/F 210-0 can receive data for a Read Status, or alternatively a Read ID command. A Read Status command can determine the status of a previously executed operation, such as those described above. Such a step can include the same general operations as Step (1) for a Page Read command, but does not include receiving address values. A Read ID command can identify devices/functions accessible by a PA processor, such as the bridge device itself, and well any devices/functions connected to second or third I/Fs (210-1 or 210-2).

Step (2): In response to command data being received and stored at I/F register 224, controller circuit 214 can access I/F register 224 to read out the command data.

Step (3): In response to the command data, controller circuit 214 can identify a register where the desired data is stored. More particularly, a controller circuit 214 can identify a physical register address based on a command data. For example, status information may reside at one address within status register 232, while ID information may reside at another address within status register 232.

Reference is now made to FIG. 6B.

Step (4): Having identified a register storing the command, such data can be output onto I/O lines 220. As but one example, such a data value can be output in response to a read enable (RE) signal applied at control inputs 218.

In this way, status information on previously executed operations and/or information on devices/functions accessible by the bridge device 200 can be accessed with page-access based command.

Figure 7:
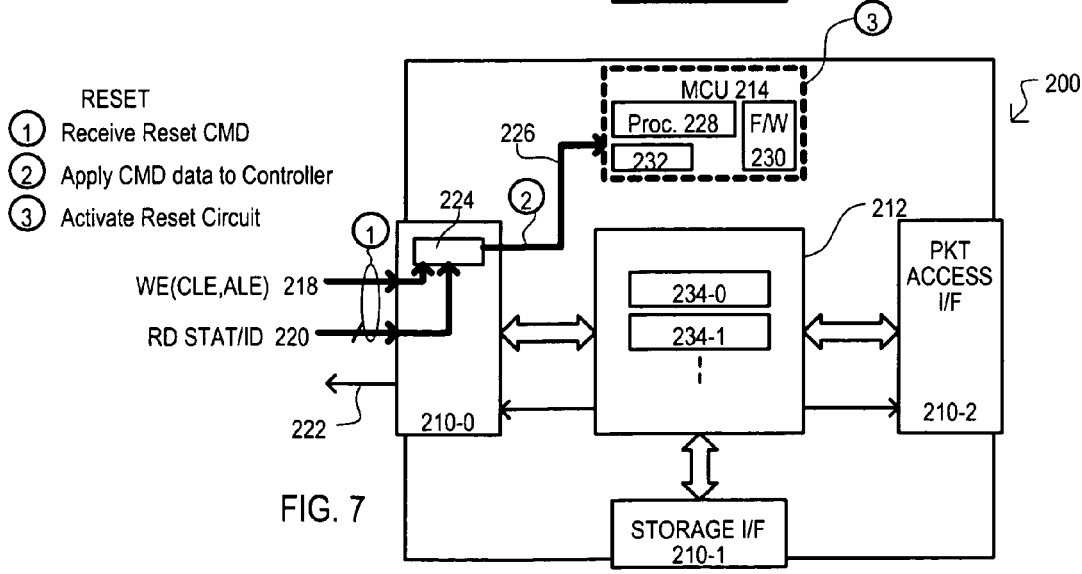
FIG. 7 shows a reset operation that can be executed the bridge device of FIG. 2.

Referring to FIG. 7, one example of a Reset operation is shown in a block diagram. Various steps are represented by circled characters, are described below:

Step (1): A first I/F 210-0 can receive data for a Reset command. Such a step can include the same general operations as Step (1) for a Page Read command, but does not include receiving address values.

Step (2): In response to command data being received and stored at I/F register 224, controller circuit 214 can access I/F register 224 to read out the command data.

Step (3): In response to the command data, controller circuit 214 can initiate a reset operation for the bridge device 200.

In this way, a reset command according to a PA device can reset a bridge device that enables access to devices and functions not otherwise compatible with the PA device interface.

Figure 8:
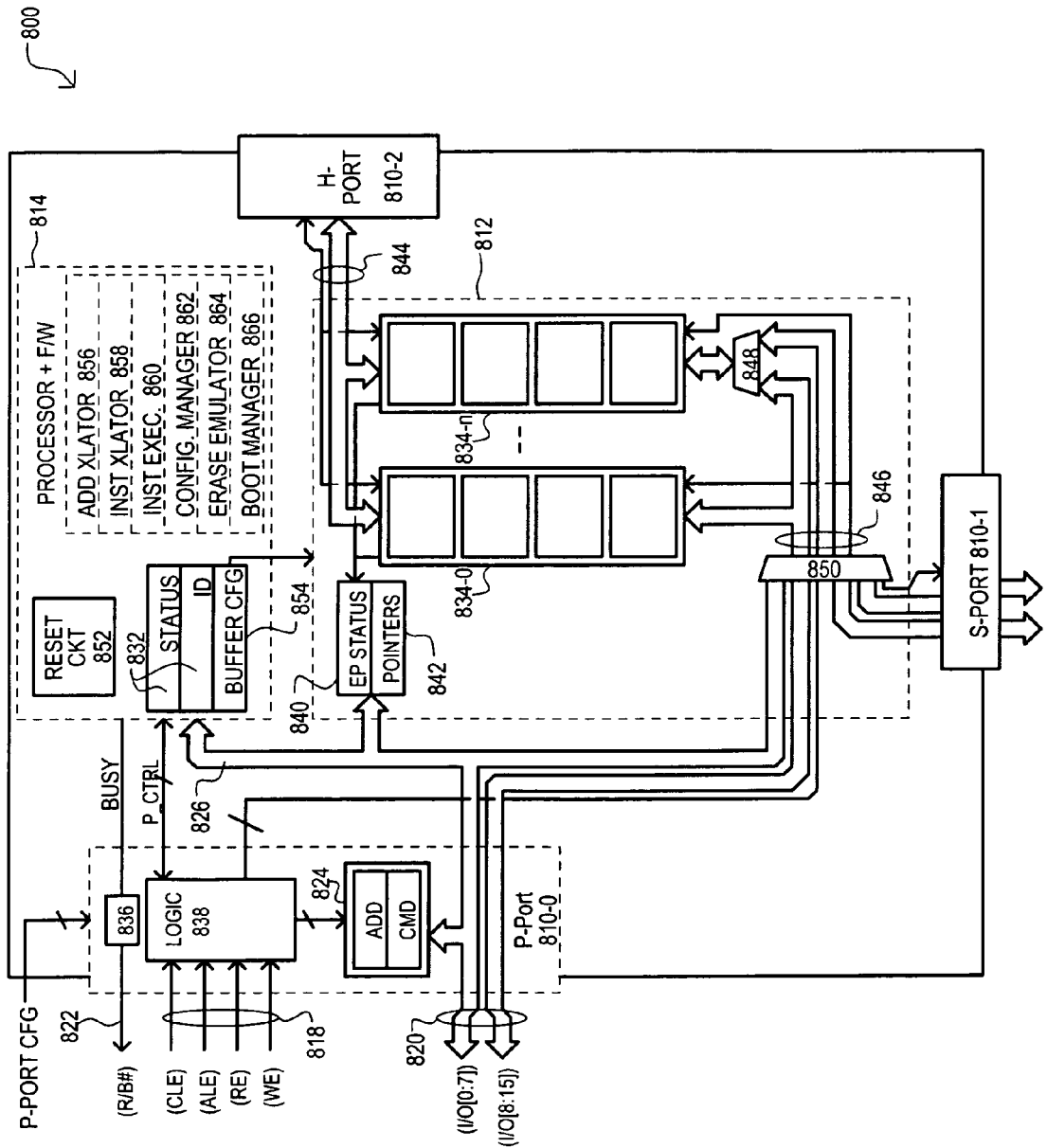
FIG. 8 is a block schematic diagram of a bridge device according to another embodiment.
Figure 25:
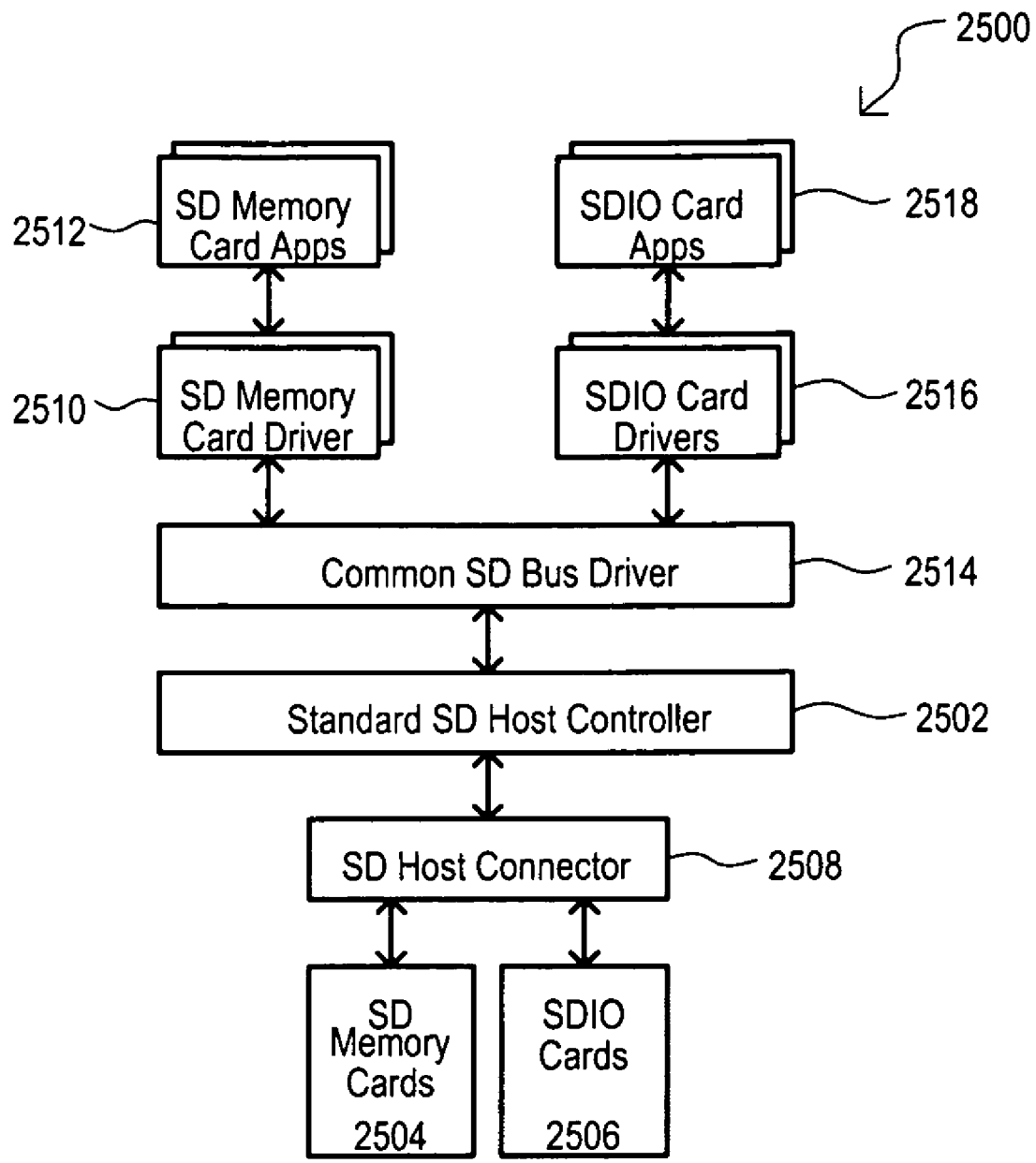
FIG. 25 is a block schematic diagram showing a conventional system with a page-access based processor.

Referring now to FIG. 8, a bridge device according to a third embodiment is shown in a block schematic diagram, and designated by the general reference character 800. In one very particular arrangement, a bridge device 800 can correspond to that shown as 102 in FIG. 1 and/or that shown as 200 in FIG. 2. Like sections are identified with the same reference character but with the first digit being an "8" instead of a "1" or "2".

In the example of FIG. 8, a first I/F 810-0 can be a processor port (P-port), configurable to receive commands from various types of processors, including a PA processor, more particularly a NAND processor. A second I/F 810-1 can be a storage port (S-Port), configurable to generate commands for accessing a storage device, such as a NAND type storage device. A third I/F 810-2 can be a host port (H-port), for receiving commands from a host device operating according to a packet based protocol, more particularly a universal serial bus (USB) host device.

Referring still to FIG. 8, in the arrangement shown, a first I/F 810-0 can include an indicator enable circuit 836 and control logic 838. Further, interface register 824 can include locations for storing address data (ADD) as well as command data (CMD). Control inputs 818 to a first I/F 810-0 can receive command latch enable (CLE), address latch enable (ALE), RE, and WE signals. Further, an I/O bus 820 can include a first portion I/O[0:7] as well as a second portion I/O[8:15]. As will be noted in more detail below, such an arrangement allows a bit width of I/O data to be configurable. In the example of FIG. 8, I/O[0:7] can be connected to I/F register 824. Further, control signals for I/F register 824 can be generated by control logic 838.

First I/F 810-0 can receive port configuration information P-PORT_CFG. All or a portion of such information can be applied by inputs external to the bridge device 800, or can be generated by processor section 814 as but two examples. Port configuration information (PORT_CFG) can configure first I/F 810-0 to not only accommodate processors other than PA processor, but to accommodate different types of PA processors, as will be described in more detail below.

A switchable communication path 812 can include a number of buffers 834-0 to 834-n, endpoint status register 840, endpoint pointers 842, a first access port 844, a second access portion 846, a width multiplexer/de-multiplexer (D/MUX) 848, and a port D/MUX 850.

Buffers (834-0 to 834-n) can be configurable to function as logical endpoints for accesses from any of first, second or third I/Fs (810-0-2). In this way, accesses from such I/Fs, can be assigned to an endpoint. In the arrangement of FIG. 8, buffers (834-0 to 834-n) can be dual port buffers, and thus are accessible via first access port 844 or second access port 846. Further, first access port 844 is accessible only by third I/F 810-2. Second access portion 846 is accessible by either first I/F 810-0 or second I/F 810-1. Preferably, buffers (834-0 to 834-n) can be configured into endpoints of various sizes, if desired.

Endpoint status register 840 can provide status information on endpoints. For example, when endpoints are being accessed, have been accessed, or are ready to be accessed.

Endpoint pointers 842 can point to physical addresses where writes or reads are to commence for a given endpoint.

A width D/MUX 848 can control the number of buffers (834-0 to 834-n) accessed in parallel. This can enable data widths for endpoints to be configurable. As but one very particular example, storage locations in individual buffers (834-0 to 834-n) can be accessed in widths of 8 bits (a byte). In one configuration, such buffers are accessed one at a time for 1-byte data width. In another configuration, two such buffers can be accessed in parallel, for a 2-byte data width.

A port D/MUX 850 can selectively connect either first I/F 810-0 or second I/F 810-2 to second access port 846.

A controller circuit 814 can include status register 832, reset circuit 852, buffer configuration register 854, and a number of functional sections shown as 856 to 866. A reset circuit 852 can reset a bridge device 800 to a default state in response to a particular state of controller circuit 814. Buffer-configuration register 854 can provide configuration values to switchable communication path 812. Such configuration values can configure the logical division of buffers (834-0 to 834-n) into endpoints, as well as the size of each such endpoint. In addition, such configuration values can control the operation of width D/MUX 848 and port D/MUX 850.

Functional sections (856 to 866) can execute predetermined functions in response to inputs received by controller circuit 814. Preferably, functional sections (856 to 866) are realized by instructions executed by a processor. However, in alternate embodiments, custom or programmable logic can be used to implement such functions. In the particular example of FIG. 8, functional sections can include an address translator 856, an instruction translator 858, a configuration manager 860, an erase emulator 862, and a boot manager 866. An address translator 856 can translate an address received at first I/F 810-0 to a logical endpoint location in buffers (834-0 to 834-n). An instruction translator 858 can process received command data into a number of operations, including reading and writing to various registers, as will be described in more detail below. An erase emulator 862 can emulate an erase operation when block erase commands received at first I/F 810-0 are directed to non-flash device destinations. A boot manager 866 can allow a device to boot from a first I/F 810-0.

Having described the bridge device of FIG. 8, various particular examples of bridge device functions will now be described.

A first function can be configurability to accommodate different page-access based standards, as well as size of address. As noted above, a first I/F 810-0 can be configurable according to port configuration information P-PORT CFG. According to one embodiment, such configuration information can control how command and address data are accessed from I/F register 824. In particular, a first I/F 824 can be configurable to accommodate different varieties of command-address sequences. FIGS. 9A to 10B-1 show one very particular example of accommodating command-address sequences for both a "small block" (SB) type PA processor as well as large block (LB) type PA processor.

Referring to FIGS. 9A and 9B, an initial portion of an instruction translator (e.g. 860) is shown as a series of steps, represented by pseudocode. Such pseudocode can represent instructions stored in an instruction memory (e.g., 230) and executed by a processor (e.g., 228). All, or portions of these steps could also be implemented with circuits (i.e., implemented with hardware only).

FIG. 9A shows how particular values can be set by a user. A value "#ADD_bytes" can be a number of sequential groups (in this case bytes) of address data that are received with page access command. Such a value can vary, as page-access storage devices (e.g., NAND memory devices) can vary in size and/or address space. Similarly, a value BLK_Size can indicate a particular PA processor configuration (SB and LB). The last two lines of FIG. 9A show a function that can be executed in response to command data being received. In the event command data is received, such command and address data can be retrieved from a P-Port Register (e.g., I/F register 224, 824).

FIG. 9B shows how command and address data can reside in an I/F register according to #ADD_bytes and BLK_Size values. According to the convention shown, command data can start at Byte[0] and address data can start at an offset from such a location Byte[0+i].

FIGS. 10A-0 and 10A-1 show a first particular configuration, in which a BLK_Size value can be SB, while a #ADD_byte can be three. FIG. 10A-0 shows how command and address data can be received at a first I/F. FIG. 10A-1 shows how address values will be understood to be stored for access by a controller circuit. Thus, according to the port configuration information, a controller circuit can access port register address 00 to acquire the single byte command data (as indicated by BLK_Size=SB), and access port register addresses 10-12 to acquire the address data. FIGS. 10B-0 and 10B-1 show another particular configuration, in which a BLK_Size value can be LB, while a #ADD_byte can be six. In such a case, a controller circuit can access port register addresses 00-01 to acquire the two bytes of command data (as indicated by BLK_Size=LB), and access port register addresses 10-15 to acquire the address data.

Of course the above are but two examples.

In this way, a first I/F (e.g., 110-0, 210-0, 810-0) can be programmable to accommodate PA processor accesses of different types.

Having described an initial command/address reception function, additional functions of a bridge device will now be described.

While the above embodiments have described particular examples of how command and address data from a PA processor can be stored and accessed, embodiments of the invention can also include processing such address data to determine a logical endpoint for data issued from the PA processor. Such a logical endpoint can correspond to a device connected to any of the other interfaces. That is, portions of an address (e.g., a NAND storage device address) issued by a PA processor, can be used to identify a non-PA device function or destination inherent in, or accessible by a bridge device. Very particular examples of such an address translation arrangement are shown in FIGS. 11A to 12.

Referring to FIG. 11A, one example of an address value that can be received at a first I/F (e.g., 210-0, 810-0) is designated by the general reference character 1100. Such an address value can be stored in an I/F register (e.g. 224, 824) and accessed by a controller circuit (e.g., 214, 814). In the example shown, address 1100 has five bytes, the bits of which have a significance with respect to one another. Further, five bits from a byte of highest significance (in this case the fifth byte) have been reserved to signify a destination for PA processor data. These five bits are shown as "edcba" and shown as 1102 in FIG. 11A.

Referring to FIG. 11B, one example of how PA processor issued address bits can be mapped to logical destinations is shown in block diagram. FIG. 11B includes a table 1104 and a representation of a switchable communication path 812. As shown, particular bit combinations can map to logical endpoints. Logical endpoints can map to buffer (in this case FIFO) base addresses. In this way, destinations for data accesses by a PA processor can be determined. It is noted that different address bit values can map to a same logical endpoint, such bits signifying a different operation or function, but a same end physical destination. Also, endpoint assignments are understood to be logical mapping, and thus can be changed on the fly (when the bridge device is initially configured or while it is in operation).

Referring to FIG. 12, one example of a controller circuit operation is shown in pseudocode. According to bit values (edcba) taken directly or indirectly from a received address value, a target endpoint can be identified. However, in addition, such address values can trigger notification to a particular interface. In particular, in the example shown, for edcba=01000 a third interface (in this example "H-Port") can be notified. Similarly, for edcba=01100 a second interface (in this example "S-Port") can be notified.

In this way, portions of a received address value can determine the processing of a corresponding command, in particular, a destination of a logical endpoint for the command.

Additional functions, common to many PA processor device commands, will now be described with reference to FIG. 13 and a number of examples shown in pseudocode. FIG. 13 shows a portion of bridge device 800 of FIG. 8. However, in FIG. 13, a controller circuit 814 is shown by circuit components, rather than executable functions. In particular, a controller circuit 814 includes a processor 828 and an instruction memory 830. In addition, switchable communication path 812 is shown in a logical representation, thus includes endpoints EP0 to EPn (868-0 to 868-n) (which can be logical divisions of buffers).

Page Read Example

Referring now to FIG. 14 in combination with FIG. 8, steps executable in response to a Page Read command are shown. In FIG. 14, it is assumed that command and address data has been received at a P-Port (e.g., first I/f). Further, it is assumed that address data has been processed to indicate a logical destination for the Page Read (a target endpoint).

Accordingly, if command data indicates a Page Read operation (line 0), a BUSY indication can be asserted (line 1). In one particular arrangement, a controller circuit 814 can assert the busy indication, which can be forwarded as an output value at P-Port. In very particular arrangements, such a signal can result in a P-Port driving a read/busy (R/B#) output, common to many PA type processor interfaces.

How a Page Read command proceeds can depend upon whether read data is already present in a target endpoint or not. If a target endpoint status indicates it is not ready (line 2) data needs to be fetched from either an H-Port or S-port.

In one particular arrangement, endpoints 868-0 to 868-n can provide status data to status register 832. A controller circuit 814 can read data from status register 832 to determine the status of any/all endpoints.

Referring still to FIG. 14, lines 3-7 show one particular example of an operation for accessing data via an H-Port in response to a Page Read command. Request data can be written to a "polled" endpoint (line 3). Request data can indicate to a host device (device connected to H-Port) particular data requested by a PA processor. A polled endpoint can be an endpoint that is periodically accessed by a host device. If a host device writes data to the target endpoint within a given time period, the target endpoint status can be changed to ready (lines 5-6). If data is not written to the target endpoint in time, the operation can timeout, or retry, or the bridge device can generate an error indication to the PA processor.

In one particular arrangement, lines 3-7 of FIG. 14 can include a controller circuit 814 writing data to polled endpoint EP0 (e.g., 868-0). A host device can periodically issue a "token IN" packet to H-Port, indicating it will be reading data from EP0, and then such data can be output as "data IN" packet by H-Port to a host device. In response to such a data IN packet, a host device can issue a "token OUT" packet informing H-Port that data will be arriving at a particular endpoint (i.e., target endpoint). A host device can then send a "data OUT" packet to H-Port, which can extract payload data to the target endpoint. Once all payload data is stored at the target endpoint, endpoint status register 840 can be updated.

Referring again to FIG. 14, Lines 8-14 show one particular example of an operation for accessing data via an S-Port in response to a Page Read command. A target endpoint (which can be determined from address data) can be configured as a target endpoint for a read command executed by S-Port. A control/data path can be enabled between S-Port and the target endpoint. If the S-Port reads data from an attached storage device to the target endpoint within a given time period, the target endpoint status can be changed to ready (lines 11-12). In addition, the control/data path between S-Port and the target endpoint can be disabled (line 13). If data is not written to the target endpoint in time, the operation can timeout, or retry, or the bridge device can generate an error indication for the PA processor (line 14).

In one particular arrangement, lines 8-14 of FIG. 14 can include a controller circuit 814 writing buffer configuration data to buffer control register 864 that results in an endpoint being designated as destination for a read operation from S-port. Further, such buffer control data can result in port D/MUX 850 enabling a communication path from S-Port to the target endpoint in switchable communication path 812. S-Port can then read data to the target endpoint. Once such a read operation is complete endpoint status register 840 can be updated.

Referring yet again to FIG. 14, lines 15-19 show steps that can be executed if the status of the target endpoint indicates the endpoint is ready. That is, Page Read data was previously loaded into the target endpoint prior to the Page Read command, or such data was loaded by accessing another device via an H-port or P-Port, as described above. When a target endpoint indicates the endpoint is ready (line 15), a pointer to the target endpoint can be set, based on address information (line 16). A MUX path can then be enabled from the P-Port the target endpoint (line 17). The BUSY indication can then be de-asserted (line 18), indicating data may now be read from the target endpoint. A PA processor can then read data from the target endpoint automatically starting at the pointer location.

In one particular arrangement, lines 15-18 of FIG. 14 can include a controller circuit 814 writing endpoint pointer data to endpoint pointers 842 based on received address data, and writing buffer configuration data to buffer control register 864 that results in an endpoint being designated as destination for a read operation from P-port. Further, such buffer control data can result in port D/MUX 850 enabling a communication path from P-Port to the target endpoint in switchable communication path 812. Once such a read path is in place, controller circuit 814 can de-assert the busy indication.

In this way, a Page Read command issued by a PA processor can be executed by a non page-access based device.

Column Address Switch (for Read) Example

Referring now to FIG. 15, steps executable in response to a Column Address Switch Data Out (CASDO) command are shown in a pseudocode example. Such a command can indicate a particular address within a page (rather than a first address of the page), from which to start a read command. In FIG. 15, it is assumed that read data has already by read into a target endpoint by a previous Page Read operation.

If command data indicates a CASDO operation (line 0), a BUSY indication can be asserted (line 1), as in the case of the Page Read operation. However, unlike a Page Read operation, if a target endpoint status indicates it is not ready (line 2) an error indication can be generated, as it is assumed read data has already be transferred into the target endpoint. In one particular arrangement, such steps can follows those of a Page Read operation, endpoints 868-0 to 868-*n* can provide status data to status register 832, and a controller circuit 814 can read such data to determine the status of any/all endpoints.

Referring still to FIG. 15, lines 4-7 of a CASDO operation can generally follow that of lines 15-18 of the Page Read operation. However, an endpoint pointer can be updated with new column address information (line 5), to ensure data is read from the appropriate location within the endpoint buffer.

In this way, a CASDO command issued by a PA processor can be executed by a non page-access based device.

Page Program Example

Referring now to FIG. 16, steps executable in response to a Page Program command are shown. As in the case of the operations described above, it is assumed that command and address data has been received at a P-Port. Further, it is assumed that address data has been processed to indicate a logical destination for the Page Program data (a target endpoint).

If command data indicates a Page Program operation (line 0), the status of the target EP can be checked to see of the target EP is read (line 1). If a target EP is not ready, the status can be checked again. In addition or alternatively, an error message can be indicated, or another EP, if suitable and available, can be designated as the target EP for the Page Program operation (line 2). The steps could then repeat to check on the status of the new target EP.

In one particular arrangement, lines 1-2 of FIG. 16 can include a controller circuit 814 reading data from endpoint status register 840. Further, if a target endpoint is to be switched, this can include controller circuit 814 writing new configuration data to buffer control register 854, to thereby associate new physical addresses with an endpoint, or vice versa.

Referring still to FIG. 16, lines 3-11 show steps that can be executed if the status of the target endpoint indicates the endpoint is ready. A target EP pointer can be set to a location indicated by the Page Program Address (line 4). In addition, a data/control path can be enabled from the P-Port the target endpoint (line 5). It is then assumed that data can be written (programmed from the perspective of the PA processor), to the target endpoint. A target endpoint status can then be monitored. If the endpoint generates a write complete indication in a predetermined amount of time (line 6), indicating program data has been received (e.g., a page of data has been written to the target endpoint), a BUSY indication can be generated at the P-Port (line 7). In addition, data can be written to a status register reflecting that the Page Program operation has been successful (line 8). If write data is not stored at a target EP in time, a BUSY indication can be generated at the P-Port (line 10). In addition, however, data can be written to a status register reflecting that the Page Program operation has not been successful (line 11). The BUSY indication can then be de-asserted. This can signal to a PA processor that a Status Read operation can be executed to determine the status of the Page Program operation.

In one particular arrangement, a Page Program operation like that described above, can include a controller circuit 814 reading data from endpoint status register 832 to determine if a target endpoint is ready. Data can be written to endpoint pointers 842 to indicate a starting physical address for program data. Further, a controller circuit 814 can write data to buffer control register 864 to enable a write data path to a target endpoint. A BUSY indication can be asserted and de-asserted in the fashion noted above. Writes to status register 832 can update status information for the Page Program operation.

In this way, a Page Program command issued by a PA processor can be executed by a non page-access based device.

Column Address Switch (for Program) Example

Referring now to FIG. 17, steps executable in response to a Column Address Switch Data In (CASDI) command are shown in a pseudocode example. Such a command can indicate a particular address within a page (rather than a first address of the page), at which to start programming data. In FIG. 17, it is assumed that command and address data has already by received at a P-Port and accessed by a controller circuit within a bridge device.

If command data indicates a CASDI operation (line 0), a status of target endpoint can be checked, as in the case of the Page Program operation. A CASDI operation can generally follow those steps of the Page Program operation noted above. However, an endpoint pointer can be updated with new column address information (line 4), to ensure data is written starting at the appropriate location within the endpoint buffer.

In this way, a CASDI command issued by a PA processor can be executed by a non page-access based device.

Block Erase Example

Referring now to FIG. 18, steps executable in response to a Block Erase command are shown. As in the case of the operations described above, it is assumed that command and address data has been received at a P-Port. Further, it is assumed that address data has been processed to indicate a logical destination for Block Erase command. How a Block Erase command is executed can depend upon whether the command is directed to a device connected to H-Port or S-Port.

In response to receiving a Block Erase command (line 0), a BUSY indication can be asserted (line 1).

Referring still to FIG. 18, lines 2-6 show one particular example of an operation for directing a Block Erase command to a device connected to an H-Port. Erase request data can be written to a "polled" endpoint (line 2). Erase request data can indicate to a host device (device connected to H-Port) particulars about an erase operation. If the host device returns result data via H-Port within a given time period, status data for the command can updated (lines 4-5). Result data returned by a host device can indicate if the host device executed the requested operation or not. If the host device does not return result data via H-Port within a given time period, status data for the command can updated to indicate the erase operation was not successful (line 6).

In one particular arrangement, lines 2-6 of FIG. 18 can include a controller circuit 814 writing data to polled endpoint EP0 (e.g., 868-0). A host device can access such a polled endpoint as described above. Result data can be returned to a predetermined endpoint. A controller circuit 814 can check such a return data endpoint to determine the status of an issued Block Erase request.

Referring again to FIG. 18, lines 7-12 show one particular example of an operation for directing a Block Erase to an S-Port. A block address value received at P-port can be converted to a block address (or addresses) corresponding to a device connected to the S-Port (line 8). A block erase command and block address (generated by the address conversion step above) can be issued by the S-Port (line 9). This can cause a desired block erase operation in a storage device attached to the S-Port. If the storage device returns result data via S-Port within a given time period, status data for the command can updated (lines 10-11). The result data can indicate if the block erase was successful or not. If the storage device does not return result data via S-Port within a given time period, status data for the command can updated to indicate the erase operation was not successful (line 13).

In one particular arrangement, lines 7-13 of FIG. 18 can include a controller circuit 814 issuing block erase commands via S-Port. Result data from a storage device can be accessed by subsequently generating a read status command to the storage device. Once result data has been accessed, such status register 832 can be updated.

Once status information has been generated by the Block Erase command, the BUSY indication can then be de-asserted (line 14). This can signal to a PA processor that a Status Read operation can be executed to determine the status of the Page Program operation.

In this way, a Block Erase command issued by a PA processor can be emulated by a non page-access based device, or executed on a storage device not directly connected to the PA processor.

Read Status Example

Referring now to FIG. 19, one example of a steps executable in response to a Read Status command is shown. It is assumed that command data has been received at a P-Port. Further, it is assumed that such data has been processed to indicate a Read Status command. In the particular example shown, in response to such a command, STATUS data can be output from a status register onto an I/O bus.

In one particular arrangement, such an operation can include a controller circuit 814 placing status data (STATUS) from status register 832 onto control data path 826 (and hence to the P-Port). Alternatively, such a step can include P-Port directly accessing status register 832, without having controller circuit 814 interpreting received command data. That is, P-Port can have logic configured to access status register 832 in response to predetermined inputs.

In this way, a Read Status command issued by a PA processor can access status information for non page-access based device, or page-access storage devices not directly connected to the PA processor.

Read ID Example

Referring now to FIG. 20, one example of a steps executable in response to a Read ID command is shown. Such steps can be essentially the same as the Read Status command described above, however ID data can be accessed from a status register. That is, a Read ID operation can access a different register address than a Read Status operation.

Reset Example

Referring now to FIG. 21, one example of a steps executable in response to a Reset command is shown. It is assumed that command data has been received at a P-Port. Further, it is assumed that such data has been processed to indicate a Read Status command. In the particular example shown, in response to such a command, reset circuits resident on the bridge device can be activated.

In one particular arrangement, such an operation can include a controller circuit 814 activating reset circuit 852.

Boot Processor Example

Referring now to FIG. 22, steps executable in response to a Boot Processor command are shown. A Boot Processor command can enable a PA processor connected to a P-Port to boot from the P-Port. That is, a PA processor can load its entire operating system (OS), or a more basic boot operating system from other some device, by way of a bridge device. In FIG. 22, it is assumed that an endpoint reserved for boot operations (Boot EP) has been predetermined. That is, a bridge device will have already designated an endpoint as a boot endpoint, by way of hardwiring, or initialization of the bridge device.

The Boot Processor example of FIG. 22 can include some of the same general steps as the Page Read operation shown in FIG. 14, but with the target EP being the Boot EP. Further, as noted above, a Boot EP is not determined according to address information, but rather is established by configuration of the bridge device.

Another difference between a Boot Processor command and Page Read command, is that a Boot Processor command can generate a predetermined indication to the PA processor to indicate the boot data can be loaded. As but one example, such an indication can be an interrupt or a direct memory access request (DRQ).

In this way, a PA processor can boot from a non page-access based device, or page-access storage devices not directly connected to the PA processor.

Of course the various detailed examples described above are but exemplary embodiments of functions executable by a bridge device.

While the above described operations have shown commands common to many NAND type device conventions, according to embodiments of the present invention, a bridge device can enable access to numerous functions beyond those normally accessible by a PA processor. One very particular example of a system configured in this manner is shown in FIG. 23, and designated by the general reference character 2300. A system 2300 can include some of the same general system components as that of FIG. 1, thus like components are referred to by the same reference character but with the first digits being "23" instead of "1". In one very particular arrangement, system 2300 can be one example of system 100 shown in FIG. 1.

In the example of FIG. 23, a PA processor 2304 can be a NAND processor having an interface suitable for a particular NAND device convention.

A first device 2306 can include numerous functions, including a storage function 2306-0, a modem function 2306-1 and an imaging function 2306-2. Accordingly, in addition to accessing storage locations by storage function 2306-0, a PA processor 2304 can also access non-storage functions 2306-1 and 2306-2.

A second device 2308 can include an operating system 2308-1 and file system 2308-0. As in the case of the first device 2306, in addition to accessing files of a file system 2308-1, a PA processor 2304 can also access functions executable by the operating system 2308-1. Second device 2308 can be a USB Host device, and thus can communicate via serial bus lines D+ and D−.

As but one example, to access non-storage related functions, a PA processor can issue a standard command (e.g., Page Read, Page Program, Block Erase, etc.) with a portion of an address indicating the particular device (e.g., 2306 or 2308) as well as the particular function on the device. In addition or alternatively, a PA processor can issue specialized commands (e.g., command data bit combinations not recognized or assigned by a given standard) to access various functions.

One approach to accessing various storage and non-storage functions is shown in a table in FIG. 24. The table of FIG. 24 includes two columns representing the output of a PA Processor, including a CMD column and ADD[h:l] column. A CMD column can represent command data issued by a PA processor. As but one example, such values can be one or more bytes issued in a particular command and address sequence. Commands "Page Read", "CASDO", "Page Program", "CASDI" and "Block Erase" are understood to be standard commands having values and sequence positions determined by a pre-existing standard.

However, FIG. 24 also shows commands "Special X" (where X is an integer). These commands represent commands outside of a standard that can provide additional functionality to a PA processor by use of a bridge device, such as those shown herein, and equivalents.

Referring still to FIG. 24 it is noted that additional functions called by a PA processor through a first I/F can include interface functions. Thus commands "Special 5" and "Special 6" show examples of interface functions that can be called. In particular, command "Special 5" can configure an H-Port to issue particular responses to a host device request. Command "Special 6" can cause S-Port to be configured to one particular storage device standard (in this example MMC+).

Column ADD[h:l] can represent address bits, preferably higher order address bits issued with a command. Such higher order address bits can identify a device and/or device location for a given command.

Of course FIG. 24 shows but one example of how functions accessible to a PA processor can be extended.

Embodiments of the present invention can be well suited to performing various other steps or variations of the steps recited herein, and in a sequence other than that depicted and/or described herein.

For purposes of clarity, many of the details of the various embodiments and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. An integrated circuit bridge device, comprising:
a first page-access (PA) processor interface circuit coupled to a buffer circuit and configurable in response to configuration information to receive command information, address information, and data values on a same multi-bit input/output (I/O) bus;
a second page-access (PA) processor interface circuit coupled to the buffer circuit and configured to communicate according to a first communication protocol different from that executable by the first interface circuit; and
a controller circuit formed in the same substrate as the first and second interface circuits, the controller circuit configured to enable data transfers between the first interface circuit and the second interface circuits via the buffer circuit.

2. The bridge device of claim 1, wherein:
the first page-access (PA) processor interface circuit includes a port register that stores values generated in response to at least the command information and address information, the port register circuit being accessible by the controller circuit.

3. The bridge device of claim 2, wherein:
the first page-access (PA) processor interface circuit is configurable to generate values for the port register circuit differently based on port configuration values, the port configuration values signifying variations in command information and address information input.

4. The bridge device of claim 3, wherein:
the port configuration values differentiate between command information and address information input formats, including
command-address sequences that start with a command value and follow with at least one address value,
command-address sequences that start with a first command value, follow with at least one address value, and conclude with a second command value, and
the number of address values received in a sequence.

5. The bridge device of claim 2, wherein:
the first page-access (PA) processor interface circuit further includes second interface logic circuitry that generates a notification signal in response to predetermined control input signals being received by the first interface circuit; and the controller circuit comprises a processor and an instruction memory and is configured to read data from the port register circuit in response to the notification signal and execute predetermined operations according to at least one value read from the port register circuit.

6. The bridge device of claim 1, further including:
the first page-access (PA) processor interface circuit includes a buy signal path coupled between the controller circuit and a busy signal output pin, the busy signal providing an indication of the status of a device connected to at least the second page-access (PA) processor interface circuit.

7. The bridge device of claim 1, further including:
an I/O data path coupled between the I/O bus and the buffer circuit;
the first page-access (PA) processor interface circuit further includes an enable signal path that couples at least one enable signal received at the first I/F to a data timing input of the buffer circuit; and
the buffer circuit controls data transfers on the I/O bus in response to at least one signal received at the data timing input.

8. The bridge device of claim 1, further including:
an I/O data path coupled between the I/O bus and the buffer circuit that includes at least two separate multi-bit internal buses; and
the buffer circuit is configurable to output data onto and input data from only one of the multi-bit internal buses in a first buffer configuration, and output data onto and input data from both multi-bit internal buses in parallel in a second buffer configuration.

9. The bridge device of claim 1, wherein:
the buffer circuit comprises
a plurality of dual port memory sections, each having a first port coupled to the first page-access (PA) processor interface circuit and a second port, and
a multiplexer-demultiplexer circuit (MUX/de-MUX) having MUX output and de-MUX input coupled to the first ports of the dual port memory sections, a first MUX input and first de-MUX output coupled to the first page-access (PA) processor interface circuit, and a second MUX input and second de-MUX output coupled to a third interface circuit configurable to interface with an external device separate from any devices connected to the first and second page-access (PA) processor interfaces.

10. The bridge device of claim 1, further including:
the controller circuit is configured to enable transfers of data between the first page-access (PA) processor interface circuit and the second page-access (PA) processor interface circuit in response to predetermined first address information, and enable transfers of data between the first page-access (PA) processor interface circuit and a third interface circuit in response to predetermined second address information.

11. A bridge device, comprising:
a page-access (PA) processor interface having a plurality of processor input/outputs (I/Os) for receiving processor commands, addresses and data on a same set of I/Os;
a buffer circuit having a plurality of storage locations logically dividable into a plurality of endpoints; and
a controller circuit comprising a processor and an instruction memory configurable to assign endpoints of the buffer circuit to at least a host interface having host inputs/outputs (I/Os) configured to receive data in a predetermined packet format, or to a storage interface having storage I/Os configurable to access data from a storage device, and to enable a data transfer path between the processor interface and a predetermined endpoint based on at least address information received on the processor I/Os.

12. The bridge device of claim 11, wherein:
the host interface comprises a universal serial bus interface having at least a first data I/O line and a second data I/O line.

13. The bridge device of claim 11, wherein:
the processing section is further configurable to, in response to at least a first predetermined command and address value at the PA processor interface, enable a data transfer path from the PA processor interface to a predetermined endpoint, and enable a data transfer path between the host interface and the predetermined endpoint.

14. The bridge device of claim 11, wherein:
the processing section is further configurable to, in response to at least a first predetermined command and address value at the PA processor interface, enable a data transfer path from the PA processor interface to a predetermined endpoint, and enable a data transfer path between the storage interface and the predetermined endpoint.

15. A method of enabling a page-access based processor to access non-page-access based devices, comprising the steps of:
(a) associating buffer locations with one of at least a second interface and a third interface of the same integrated circuit device; and
(b) in response to a predetermined sequence of command data and address data received on a same set of input/output (I/O) lines at a first interface of the integrated device, coupling the I/O lines to one of the buffer locations.

16. The method of claim 15, further including:
step (b) includes selecting between one buffer location associated with the second interface and one buffer location associated with the third interface based on at least at portion of the address data.

17. The method of claim 15, further including:
(c) connecting a non-page access device different than the integrated circuit device to the second interface; and
(d) after step (b), transferring request data from one of the buffer locations to the non-page access device, and executing a predetermined function of the non-page access device in response to the request data.

18. The method of claim 15, further including:
(c) in response to the predetermined sequence of command data and address data, generating a busy indication at the first interface that indicates the status of an operation executed on a non-page access device attached to the second interface.

19. The method of claim 15, wherein:
steps (a) includes mapping buffer locations to logical endpoints to allow a controller circuit formed on the integrated circuit to control access to the buffer locations based on an endpoint value; and
steps (b) includes identifying a destination endpoint based on at least the address data.

20. The method of claim 15, further including:
(c) prior to step (a), coupling a non-NAND flash device to at least the third interface; and
step (b) includes
the command data and address data being in a predetermined format for a NAND flash device, executing a sequence of predetermined processor instructions in response to the command and address data to generate configuration values, and in response to the configuration values, coupling the I/O lines to one of the buffer locations and coupling the one of the buffer locations to the third interface to transfer data between the first interface and third interface in response to the command data and address data.

* * * * *